(12) United States Patent
Chen et al.

(10) Patent No.: US 11,305,875 B2
(45) Date of Patent: Apr. 19, 2022

(54) MULT-FUNCTIONAL COMPARTMENT

(71) Applicant: SZ DJI TECHNOLOGY CO., LTD., Shenzhen (CN)

(72) Inventors: Hanping Chen, Shenzhen (CN); Xiangyu Chen, Shenzhen (CN); Mingxi Wang, Shenzhen (CN); Qi Zhou, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 639 days.

(21) Appl. No.: 16/245,590

(22) Filed: Jan. 11, 2019

(65) Prior Publication Data
US 2019/0144115 A1 May 16, 2019

Related U.S. Application Data

(63) Continuation of application No. PCT/CN2016/089909, filed on Jul. 13, 2016.

(51) Int. Cl.
*B64C 39/02* (2006.01)
*B64C 25/32* (2006.01)

(52) U.S. Cl.
CPC ............ *B64C 39/024* (2013.01); *B64C 25/32* (2013.01); *B64C 2201/027* (2013.01); *B64C 2201/042* (2013.01); *B64C 2201/108* (2013.01); *B64C 2201/127* (2013.01); *B64C 2201/14* (2013.01); *B64C 2201/18* (2013.01); *B64C 2211/00* (2013.01)

(58) Field of Classification Search
CPC ........ B64C 2201/042; B64C 2201/123; B64C 2201/126; B64C 2201/127; B64C 2201/128; B64C 2201/20; B64C 2201/201; B64C 2201/203
See application file for complete search history.

(56) References Cited

U.S. PATENT DOCUMENTS

| | | | |
|---|---|---|---|
| 8,967,529 B1 | 3/2015 | Benneii | |
| 9,309,006 B2 * | 4/2016 | Zwaan | ..................... B64D 9/00 |
| 9,815,554 B2 * | 11/2017 | Plater | ..................... B64C 39/024 |
| 9,850,004 B2 * | 12/2017 | Zwaan | ................. B64C 39/024 |
| 9,975,644 B1 * | 5/2018 | Kimchi | ................. B64C 39/024 |

(Continued)

FOREIGN PATENT DOCUMENTS

| | | |
|---|---|---|
| CN | 103818544 A | 5/2014 |
| CN | 104903194 A | 9/2015 |

(Continued)

OTHER PUBLICATIONS

The World Intellectual Property Organization (WIPO) International Search Report and Written Opinon for PCT/CN2016/089909 dated Apr. 17, 2017 8 Pages.

*Primary Examiner* — Philip J Bonzell
(74) *Attorney, Agent, or Firm* — Anova Law Group, PLLC

(57) ABSTRACT

A method for operating a vehicle chassis includes providing the vehicle chassis including a main body and at least one compartment arranged on the vehicle chassis, selectively receiving one or more components in the compartment, and effecting an operational state of a vehicle comprising the vehicle chassis based on a type of at least one of the one or more components that are selectively received in the compartment. The one or more components is selected from a plurality of components of different types.

18 Claims, 10 Drawing Sheets

(56) References Cited

U.S. PATENT DOCUMENTS

| | | | |
|---|---|---|---|
| 9,979,000 B2 * | 5/2018 | Qiu | B64C 39/024 |
| 10,044,013 B2 * | 8/2018 | Qiu | B64C 39/024 |
| 10,074,836 B2 * | 9/2018 | Qiu | H01M 50/20 |
| 10,090,496 B2 * | 10/2018 | Qiu | B64C 39/024 |
| 10,115,944 B2 * | 10/2018 | Qiu | B64C 39/024 |
| 10,189,581 B2 * | 1/2019 | Zwaan | B64D 9/00 |
| 10,224,526 B2 * | 3/2019 | Qiu | H01M 50/20 |
| 10,442,533 B2 * | 10/2019 | Qiu | B64C 25/08 |
| 10,457,418 B2 * | 10/2019 | Zwaan | B64D 47/08 |
| 10,745,128 B2 * | 8/2020 | Qiu | B64C 39/024 |
| 10,793,267 B2 * | 10/2020 | Lee | B64C 39/024 |
| 10,800,544 B2 * | 10/2020 | Zwaan | B64C 39/024 |
| 11,021,240 B2 * | 6/2021 | Lee | B64C 39/024 |
| 2006/0091258 A1 * | 5/2006 | Chiu | B64C 1/30 244/119 |
| 2011/0174931 A1 | 7/2011 | Berland | |
| 2013/0193269 A1 * | 8/2013 | Zwaan | B64D 47/08 244/118.1 |
| 2016/0122012 A1 | 5/2016 | Choo et al. | |
| 2016/0176520 A1 | 6/2016 | Goldstein | |
| 2016/0179096 A1 | 6/2016 | Bradlow et al. | |
| 2016/0251087 A1 * | 9/2016 | Zwaan | B64D 47/08 244/118.1 |
| 2017/0247113 A1 * | 8/2017 | Sanlaville | B64C 27/08 |
| 2017/0256763 A1 * | 9/2017 | Qiu | H01M 50/20 |
| 2017/0338455 A1 * | 11/2017 | Qiu | B64C 39/024 |
| 2018/0069216 A1 * | 3/2018 | Qiu | H01M 50/20 |
| 2018/0069217 A1 * | 3/2018 | Qiu | H01M 50/20 |
| 2018/0069218 A1 * | 3/2018 | Qiu | B64C 39/024 |
| 2018/0076431 A1 * | 3/2018 | Qiu | H01M 50/20 |
| 2018/0086480 A1 * | 3/2018 | Zwaan | B64C 39/024 |
| 2018/0155024 A1 * | 6/2018 | Lee | B64D 47/08 |
| 2018/0170533 A1 * | 6/2018 | Lee | B64C 1/08 |
| 2019/0071180 A1 * | 3/2019 | Qiu | B64C 27/50 |
| 2019/0118971 A1 * | 4/2019 | Zwaan | B64D 9/00 |
| 2020/0001997 A1 * | 1/2020 | Qiu | B64C 27/50 |
| 2020/0062418 A1 * | 2/2020 | Zwaan | B64D 9/00 |
| 2021/0016896 A1 * | 1/2021 | Zwaan | B64D 9/00 |
| 2021/0107644 A1 * | 4/2021 | Qiu | B64D 27/24 |

FOREIGN PATENT DOCUMENTS

| | | |
|---|---|---|
| CN | 104973263 A | 10/2015 |
| CN | 105059528 A | 11/2015 |
| CN | 205366072 U | 7/2016 |
| CN | 205366272 U | 7/2016 |
| WO | 2012130790 A2 | 10/2012 |

* cited by examiner

Part B

Part A

MULT-FUNCTIONAL COMPARTMENT

CROSS-REFERENCE TO RELATED APPLICATION

This application is a continuation of International Application No. PCT/CN2016/089909, filed on Jul. 13, 2016, the entire contents of which are incorporated herein by reference.

BACKGROUND

A variety of different types of vehicles are widely used for various purposes. Typically, the vehicles may include but are not limited to wagons, bicycles, motor vehicles (e.g., motorcycles, cars, trucks, and buses), railed vehicles (e.g., trains, trams), watercraft (e.g., ships and boats), and aerial vehicles (e.g., aircraft and spacecraft). Among these vehicles, aerial vehicles, such as unmanned aerial vehicles (UAVs), have played an important role in performing surveillance, reconnaissance, and exploration tasks for various military and civilian applications. UAVs may be outfitted with a number of functional payloads, such as imaging devices for aerial photography and sensors for collecting data from the surrounding environment. For example, remote-controlled UAVs may be used to provide aerial imagery of otherwise inaccessible environments. The design of UAVs involves tradeoffs between vehicle size, weight, portability, payload capacity, energy consumption, and cost.

SUMMARY

A vehicle chassis is a main component of a vehicle, and may be configured to hold, house, accommodate, receive or connect one or more components of the vehicle. In an aerial vehicle, such as an unmanned aerial vehicle (UAV), the vehicle chassis may comprise a central body of the UAV. The central body may be configured to accommodate or receive one or more components or modules that allow the UAV to operate in different operational states. The size, volume, and/or profile of the aerial vehicle may be largely influenced by the size and/or shape of the vehicle chassis (e.g., central body). For example, having a large central body may adversely affect the mobility and portability of a UAV. Accordingly, it is often desirable to maximize utilization of an internal space of the central body, without increasing the dimension of the central body.

To at least address the above-described problem, a vehicle chassis may be provided in accordance with embodiments of the disclosure. The vehicle chassis has improved form factor. Additionally, the internal space within the vehicle chassis can be utilized to a greater extent. In some embodiments, the vehicle may be an aerial vehicle (such as a UAV), and foldable landing gears may be provided such that the UAV occupies a reduced volume of space when the UAV is in a non-operational state. For example, the UAV may have a substantially flat/planar profile when the foldable landing gears are folded onto/into the vehicle, which improves portability and transportation of the UAV.

According to an aspect of the disclosure, a vehicle chassis comprising a main body is provided. The vehicle chassis also comprises at least one compartment arranged on the main body, wherein the compartment has at least one opening for selectively receiving one or more different types of components from a plurality of different types of components. An operational state of a vehicle comprising the vehicle chassis is effected based on the type(s) of components that are selectively received in the compartment.

According to another aspect of the disclosure, a method for operating a vehicle chassis is provided. The method comprises providing a vehicle chassis, wherein the vehicle chassis comprises a main body and at least one compartment arranged on the vehicle chassis. The method also comprises selectively receiving one or more different types of components from a plurality of different types of components in the compartment. The method further comprises effecting an operational state of a vehicle comprising the vehicle chassis based on the type(s) of the components that are selectively received in the compartment. In some embodiments, the vehicle in the method is an unmanned aerial vehicle (UAV).

According to a further aspect of the disclosure, a vehicle comprising a vehicle chassis is provided. The vehicle also comprises a propulsion system operably coupled to the vehicle chassis, wherein the propulsion system is configured to provide lift for the vehicle. In some embodiments, the vehicle is an unmanned aerial vehicle (UAV).

According to an additional aspect of the disclosure, a kit is provided. The kit includes a vehicle chassis comprising a main body and at least one compartment arranged on the main body, wherein the compartment is configured to selectively receive one or more different types of components from a plurality of different types of components. The kit also comprises a propulsion system configured to operably couple to the vehicle chassis. The kit further comprises instructions for assembling the vehicle chassis and the propulsion system to construct a vehicle, such that when the vehicle is assembled according to the instructions, the assembled vehicle is characterized in that an operational state of the vehicle is effected based on the type(s) of components that are selectively received in the compartment.

In some embodiments, the vehicle may be an unmanned aerial vehicle (UAV). In some instances, the one or more components may comprise one or more propulsion units configured to provide lift for the UAV. In some instances, the operational state of the vehicle may change when different types of components are selectively received in the compartment. In some instances, the different types of components may be received or retracted into the compartment based on the operational state of the vehicle.

In some instances, the vehicle may be in a first operational state when a first type of component is received or retracted into the compartment. In some instances, the first type of component may be selected from a group comprising of a battery unit, a flight control module, and/or landing gears. In some instances, the vehicle may be powered on and/or in motion when the vehicle is in the first operational state. In some embodiments, the vehicle may be in a second operational state when a second type of component is received or retracted into the compartment. In some instances, the second type of component may be selected from a group comprising of a payload, a carrier configured to support the payload, and/or an arm configured to support a propulsion unit of the vehicle.

In some instances, the vehicle may be powered off and/or at rest when the vehicle is in the second operational state. In some instances, the different types of components may be removed or extended out from the compartment based on the operational state of the vehicle.

In some embodiments, the vehicle may be in a first operational state when a first type of component is removed or extended out from the compartment. In some instances, the first type of component may be selected from a group comprising of a payload, a carrier configured to support the payload, and/or an arm configured to support a propulsion unit of the vehicle. In some instances, the vehicle may be powered on and/or in motion when the vehicle is in the first operational state.

In some embodiments, the vehicle may be in a second operational state when a second type of component is removed or extended out from the compartment. In some instances, the second type of component may be selected from a group comprising of a battery unit, a flight control module, and/or landing gears. In some instances, the vehicle may be powered off and/or at rest when the vehicle is in the second operational state.

In some embodiments, the compartment may be configured to accept only one type of components within its cavity at any given time. Alternatively, the compartment may be configured to accept multiple different types of components within its cavity at any given time. In some instances, insertion or retraction of one type of component into the compartment may cause another type of component within the compartment to be extended or pushed out. In some instances, the insertion or retraction of the one type of component into the compartment may trigger the other type of component to be pushed out of the compartment. In some embodiments, the other type of component may be pushed out of the compartment by a driving unit.

In some embodiments, the extending or pushing of the one type of component out of the compartment may trigger the other type of component to be inserted or retracted into the compartment. In some instances, the other type of component may be inserted or retracted into the compartment by a driving unit.

In some embodiments, a first type of component may be a battery unit and a second type of component may be a payload and/or carrier, and wherein the insertion of the battery unit into the compartment may cause the payload and/or carrier to be extended out from the compartment. In some instances, the retraction of the payload and/or carrier into the compartment may cause the battery unit to be pushed out from the compartment. In some embodiments, the insertion or retraction of one type of component may occur in a first direction and the extending or pushing out of another type of component may occur in a second direction that is same or different from the first direction.

In some embodiments, the compartment may comprise one or more openings for accepting, removing, retracting, and/or extending different types of components. In some instances, the compartment may be configured to simultaneously accept a plurality of components. In some embodiments, the compartment may comprise a plurality of sections for simultaneously accepting two or more components. In some instances, the compartment may comprise a plurality of sections for allowing one or more components to move between the plurality of sections during retraction and/or extension of the one or more components. In some instances, when a first component from the plurality of components is moved within the compartment, a space may be generated within the compartment for accepting a second component from the plurality of components. In some instances, when a first component from the plurality of components is pushed out of the compartment by a second component from the plurality of components, a space may be generated within the compartment for accepting a third component from the plurality of components.

In some embodiments, when a first component from the plurality of components is partially moved out of the compartment, a space may be generated within the compartment for fully or partially accepting a second component from the plurality of components. In some embodiments, the second component may be configured to push the first component out of the compartment such that the second component may be completely accepted within the compartment.

In some embodiments, insertion or retraction of a first component into the compartment may cause a second component within the compartment to be extended or pushed out, and change the operational state of the vehicle. In some instances, the first component may be a battery unit for powering the vehicle when the battery unit is inserted or retracted into the compartment. In some instances, the first component may be a flight control module for flight control of the vehicle when the flight control module is inserted or retracted into the compartment. In some embodiments, the second component may be a payload and/or carrier. In some instances, the payload and/or carrier may be inserted or retracted into the compartment to push the battery unit out of the compartment such that the power to the vehicle, the payload and/or the carrier may be terminated.

In some instances, the battery unit may be inserted or retracted into the compartment to push the payload and/or carrier out of the compartment such that the battery unit may power at least one of the payload, the carrier, and/or the vehicle.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

Figure 1:
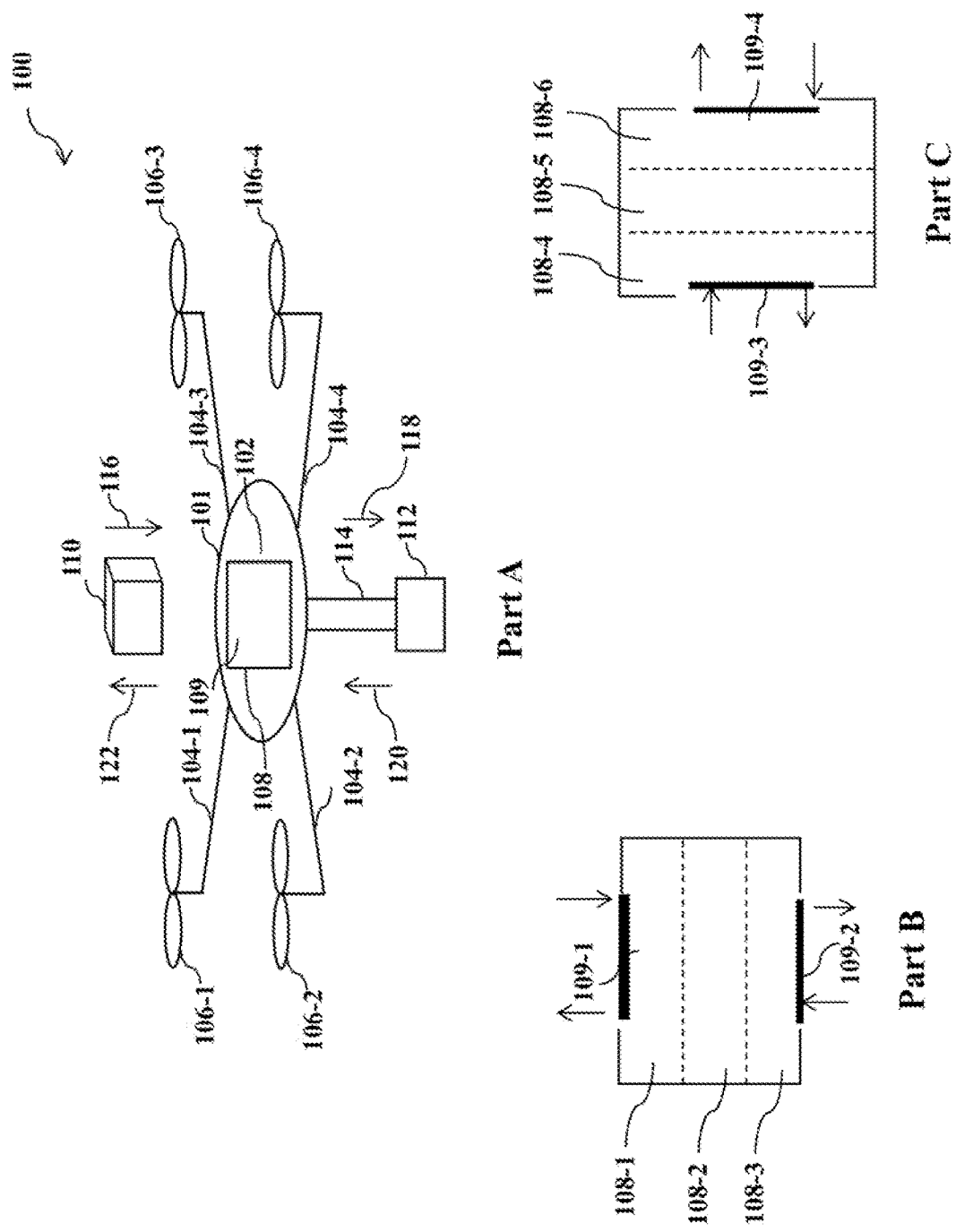
FIG. 1 illustrates a schematic view of a vehicle with a vehicle chassis comprising a multi-functional compartment, in accordance with embodiments of the disclosure.

Systems, apparatus, and methods for improving usage of an internal space of a vehicle chassis are provided. In some embodiments, the vehicle chassis may comprise a main body which may be formed in different shapes, depending on the type of vehicle for which the vehicle chassis is used. In some instances, the vehicle may be an unmanned aerial vehicle (UAV) and the main body may include a central body of the UAV. The central body may be formed in any regular or irregular shape, and/or different sizes to accommodate various design requirements, environments, fields, or the like. For example, a central body may be formed having a rectangular, hexagonal, octagonal, decagonal, prismatic, spherical, ellipsoidal shape, or the like.

In some embodiments, the vehicle chassis may comprise at least one compartment arranged on the main body. The compartment may have at least one opening for selectively receiving one or more different types of components from a plurality of different types of components. In some instances, the vehicle chassis may comprise more than one compartment for receiving more components. Similarly, in some instances, the compartment may have more than one opening for selectively receiving, removing, retracting, and/or extending one or more different types of components. For example, two or more types of components may be received into or extended out of the vehicle chassis. Accordingly, by providing a plurality of openings at different parts of the compartment, a plurality of components can be received into (and removed from) the compartment in various configurations.

In some embodiments, the vehicle may be a UAV and the vehicle chassis may comprise a central body of the UAV. A compartment may be arranged within the central body of the UAV. For example, the compartment may be arranged as a cavity within the central body. An opening of the cavity may be disposed in a vertical direction or a horizontal direction with respect to the central body. Accordingly, different types of components can be received into the cavity in different directions. The directions may be parallel, orthogonal, or oblique to one another. In some instances, the components may be pushed, received or retracted into the compartment in a manual, semi-automatic, or fully automatic manner, as described later in the specification.

In some embodiments, the components that are received into the compartment may be extended or pushed out of the compartment such that other components can be received into the compartment. The extending or pushing of the components out of the compartment may also be implemented in various ways. For example, the components may be pushed or retracted into the compartment in a manual, semi-automatic, or fully automatic manner, as described later in the specification.

In some embodiments, an operational state of a vehicle comprising the vehicle chassis may be effected based on the type(s) of components that are selectively received in the compartment. In some instances, the vehicle may be powered on and/or in motion in a first operational state. Conversely, the vehicle may be powered off and/or at rest in a second operational state. In some instances, the operational state of the vehicle may change when different types of components are selectively received into (or removed from) the compartment. For example, the vehicle may be in a first operational state when a first type of component is removed or extended out of the compartment. Similarly, the vehicle may be in a second operational state when a second type of component is removed or extended out of the compartment.

The components as described above and elsewhere herein can enable one or more of the vehicle's operations. In some embodiments, when the vehicle is an aerial vehicle, such as a UAV, the components may include multiple types of components. In some instances, the first type of component may be selected from a group comprising of a battery unit, a flight control unit, and/or landing gears (e.g., foldable landing gears). In some instances, the second type of component may be selected from another group comprising of a payload, a carrier configured to support the payload, and/or an arm configured to support a propulsion unit of the UAV.

In some embodiments, the compartment may be configured to accept only one type of component within its cavity at any given time. For example, in some instances, the first type of the component is a carrier and the second type of the component is a battery unit. One of the carrier and battery unit may be received into the cavity, and the other one of the carrier and battery unit may be extended out of the cavity. In some embodiments, when the UAV is to be powered on or operated, the battery unit may be pushed into or received in the cavity such that the UAV is in the first operational state. Conversely, when the UAV is to be powered off or cease operation, the battery unit may be pushed out of the cavity and the carrier may be received into the cavity such that the UAV is in the second operational state. In the above-described embodiment, the compartment may be used by one type of component at any given time.

In some embodiments, the compartment may be configured to accept multiple different types of components within its cavity at any given time. In some instances, the compartment may be configured to simultaneously accept a plurality of components. For example, the compartment may comprise a plurality of sections for simultaneously accepting two or more components. The plurality of sections may be arranged such that one or more components are allowed to move between the plurality of sections during retraction and/or extension of the one or more components. In some instances, when a first component from the plurality of components is moved within the compartment, a space may be generated within the compartment for accepting a second component from the plurality of components. In some instances, when a first component from the plurality of components is pushed out of the compartment by a second component from the plurality of components, a space may be generated within the compartment for accepting a third component from the plurality of components. For example, the first component may be a battery unit, the second component may be a gimbal and the third component may be one or more arms. In this case, when the battery unit is pushed out of the compartment by the gimbal, the one or more arms may be received in the compartment together with the gimbal.

In some instances, when a first component from the plurality of components is partially moved out of the compartment, a space may be generated within the compartment for fully or partially accepting a second component from the plurality of components. In some implementations, the second component may be configured to push the first component out of the compartment such that the second component is completely accepted within the compartment.

In some embodiments, insertion or retraction of a first component (or a first type of component) into the compartment may cause a second component (or a second type of component) within the compartment to be extended or pushed out of the compartment, and thereby change the operational state of the vehicle. In some instances, the first component may be a battery unit for powering the vehicle when the battery unit is inserted or retracted into the compartment. In other instances, the first component may be a flight control module for flight control of the vehicle when the flight control module is inserted or retracted into the compartment. Accordingly, the insertion or retraction of the first component may cause the vehicle to be in a first operational state. In some instances, the second component may be a payload and/or carrier. The payload and/or carrier may be inserted or retracted into the compartment to push the battery unit out of the compartment, such that the power to the vehicle, the payload and/or the carrier is terminated. In other words, the vehicle may be in a second operational state after the second component is received in the compartment.

In some embodiments, the components may be extendable or retractable into or out of the compartment. The retraction of components into the compartment or the extending of components out of the compartment can be implemented automatically or semi-automatically using one or more drive units or actuator mechanisms, as described later in the specification.

Various embodiments of the disclosure are next described with reference to the accompanying drawings.

FIG. 1 illustrates a schematic view of a vehicle with a vehicle chassis comprising a multi-functional compartment, in accordance with embodiments of the disclosure. The vehicle may include an aerial vehicle, such as a UAV. Any description herein of a UAV may apply to any type of movable object and vice versa. The movable object may be a motorized vehicle or vessel having one or more fixed or movable arms, wings, extended sections, and/or propulsion units.

Referring to Part A of FIG. 1, a UAV 100, which may be considered as a specific form of the vehicle, may comprise a vehicle chassis 101. The vehicle chassis may comprise a main body, e.g., a central body 102 as shown. The central body may correspond to an airframe, a housing or a fuselage of the UAV. The central body may have any shape and size to accommodate various design requirements, environments, fields, or the like. In some embodiments, the central body may be in a regular shape or an irregular shape. For example, a shape of the central body may be rectangular, prismatic, spherical, ellipsoidal, or the like.

The central body shown in FIG. 1 may enclose one or more electrical components therein. For instance, a flight control unit, one or more navigation units (e.g., a globe positioning system unit), communication units (e.g., wired or wireless communication units), a variety of sensors, and/or power units (e.g., a rechargeable battery unit) may be provided within the central body.

As shown in FIG. 1, a plurality of arms 104, such as 104-1, 104-2, 104-3, and 104-4, may be integrally formed or connected with the central body of the UAV. In some embodiments, each arm may be moveably or releasably connected with the central body such that each arm may be extendable away from the central body or foldable toward the central body. Each arm may comprise a proximal end, a distal end and a plurality of foldable middle sections (not shown) that are movably connected to one another between the proximal end and the distal end. The proximal end of the arm may be rotatably connected to the central body via one or more connecting mechanisms. The distal end of the arm may be connected to or configured to support one or more propulsion units, such as 106-1, 106-2, 106-3 and 106-4 as shown. Each of the propulsion units may comprise one or more rotor blades.

An arm may be any frame member, connecting member, mounting arm, connecting arm, torsion arm, elongated arm, support frame, etc. that can be used to connect the propulsion units to the central body. An arm may have any shape, and need not be limited to a linear shape. For example, an arm may be formed having a regular shape (e.g., cylindrical, rectangular block, circular or rectangular plate, etc.) or any irregular shape. In some implementations, the arms of the UAV as described herein may be implemented as tubes or rods extended laterally from the central body. For instance, the arms of the UAV may be hollow tubes or solid tubes, which may be formed from a metallic, plastic, or composite material. Alternatively, the arms of the UAV may be made from a lightweight material. For instance, the arms of the UAV may be formed from carbon fiber. Any dimension (e.g., length, width, thickness, diameter, circumference, or area) of the arm may be contemplated.

Although illustrated herein as having four arms, the UAV may have any number of arms for different purposes. For example, the number of arms may be selected or determined based on one or more factors, for example, a shape, a size or a weight of a central body of the UAV, a flight environment, a weight or a size of a payload with a carrier supporting the payload, tasks to be conducted by the UAV, or any combination thereof.

In some implementations, a number of arms may be spaced apart evenly on a perimeter or periphery of a central body. In those cases, the arms may be extended from the central body of the UAV. In some embodiments, each of the plurality of arms may be configured to be rotatably connected to the central body. In some implementations, each arm is configured to be pivotally coupled to the central body via a shaft. The shaft may be parallel to a yaw axis of the UAV. In some implementations, each of the plurality of arms is configured to be extendable from the central body using one or more actuators in an actuator mechanism. In this case, each arm may be connected to each actuator via a linkage mechanism. In some embodiments, the arm may be releasably connected with the central body using quick release mechanisms. Therefore, the arm may be packaged and transported independently of the central body or received in the central body, as will be discussed in detail with reference to FIG. 7.

The vehicle chassis may further comprise at least one compartment 108, which is schematically illustrated as being located at a central portion of the central body. The compartment may be configured to selectively receive one or more different types of components from a plurality of different types of components, such as components 110, 112 and 114.

Although the compartment is shown in FIG. 1 as having a substantially rectangular shape and being arranged at the central portion of the central body of the UAV, the shape and location of the compartment may not be limited thereto. The compartment may be designed in different shapes and arranged at any suitable locations on the UAV. For example, in some instances, the compartment may be a hollow cavity with one of a cuboid structure, a hexahedron structure, an octahedron structure or a cylinder structure inside the central body. In some instances, the location of the compartment may be arranged around the periphery or perimeter of the central body. In some instances, the compartment may be located between the center and periphery of the central body.

In some embodiments, more than one compartment may be arranged within the central body. The plurality of compartments may be arranged symmetrically or asymmetrically relative to the center of the central body. In some instances, these compartments may be arranged radially outward from the center of the central body. The compartments may have different dimensions such that components of different sizes can be received into the respective compartments. In some instances, a dimension of a compartment may be greater than a dimension of the component, such that the component can be completely received into the compartment. In some other instances, a dimension of a compartment may be less than a dimension of the component, such that the component can only be partially received into the compartment.

The compartment may have an opening 109 for receiving a component. The orientation of the opening may be arranged in any configuration. In some instances, the opening may face upward or downward relative to the central body (e.g., along or parallel to a yaw axis of the central body). In some instances, the opening may face left or right relative to the central body (e.g., along or parallel to a roll axis of the central body). In some instances, the opening may face forward or backward relative to the central body (e.g., along or parallel to a pitch axis of the central body). The opening can be set in a horizontal direction or a vertical direction with respect to the central body, to allow a user to easily access the component. In some cases, the opening may be disposed along an axis that is oblique to the pitch/roll/yaw axis of the central body. The axis may intersect a center of the central body obliquely at any angle in 3-dimensional space.

In some embodiments, the compartment may have more than one opening. For example, two openings may be located respectively at two sides of the compartment. In some instances, the openings may be opposite to one another, and may form a direct path or through hole within the compartment. In those instances, a component that is received horizontally (or vertically) into the compartment may push another component out of the compartment in the same direction. In some other cases, the respective longitudinal axes of the two openings may be orthogonal to each other such that two mutually-perpendicular paths are formed within the compartment. In those instances, a component may be received into the compartment horizontally relative to the central body, while another component may be pushed out of the compartment vertically relative to the central body.

The components may be of different types. In some embodiments, when the vehicle is a UAV, the components may include but are not limited to one or more of the following: a battery unit, a flight control module, one or more propulsion units, landing gears, a payload, a carrier, arms, and the like. The battery unit herein may be rechargeable and intelligent, i.e., an intelligent battery. The intelligent battery may include one or more internal control systems or circuits to monitor multiple parameters about the battery unit and perform corresponding procedures. The parameters may comprise a current, voltage, voltage drop, temperature, power, total capacity, remaining capacity, internal resistance, or discharge rate of the one or more battery units. For instance, when the remaining capacity drops below a predetermined threshold, the internal control system may directly notify the operator of low power via a light-emitting diode (LED) on the panel of the battery unit. Alternatively, the internal control system may notify the operator of low power via a remote controller, which may wirelessly communicate with a flight control module on-board the UAV. The flight control module may control operations of the UAV, and may be capable of receiving instructions, generating responses and controlling flight of the UAV.

In some embodiments, to improve control of the UAV, the flight control module may be connected to various sensors built in or mounted on the central body. The sensors may also be arranged on or within one or more arms of the UAV. In some instances, the UAV may comprise one or more vision sensors such as an image sensor for image capturing, image recognition, and/or obstacle avoidance. For example, an image sensor may be a monocular camera, a binocular camera, a stereo vision camera, radar, sonar, or an infrared camera. The UAV may further comprise other sensors capable of determining a location of the UAV, such as global positioning system (GPS) sensors, inertial sensors which may be used as part of or separately from an inertial measurement unit (IMU) (e.g., accelerometers, gyroscopes, magnetometers), lidar, ultrasonic sensors, acoustic sensors, WiFi sensors and the like.

In some embodiments, the UAV may have on-board sensors. The on-board sensors may collect information directly from an environment without requiring communication with a component off-board the UAV for additional information or processing. For example, a sensor that collects data directly in an environment can be a vision or audio sensor. Additionally or alternatively, the UAV may have sensors that are on-board the UAV but may be in communication with one or more components off-board the UAV to collect data about an environment. The sensor may include a GPS sensor or another sensor that is in communication with another device, such as a satellite, tower, router, server, or other external device.

As another example, some sensors may generate absolute measurement data that is provided in terms of a global coordinate system (e.g., position data provided by a GPS sensor, attitude data provided by a compass or magnetometer), while other sensors may generate relative measurement data that is provided in terms of a local coordinate system (e.g., relative angular velocity provided by a gyroscope; relative translational acceleration provided by an accelerometer; relative attitude information provided by a vision sensor; relative distance information provided by an ultrasonic sensor, lidar, or time-of-flight camera).

The propulsion units described herein may permit a UAV to move about in the air, for example, ascending, descending or accelerating. In some embodiments, one or more propulsion units may be connected to a distal end of the arm, and may enable the UAV to move about one or more, two or more, three or more, four or more, five or more, six or more degrees of freedom. In some instances, the UAV may be capable of rotating about one, two, three or more axes of rotation. The axes of rotation may be orthogonal to one another and may remain orthogonal to one another throughout the course of the UAV's flight. The axes of rotation may include a pitch axis, a roll axis, and/or a yaw axis.

The propulsion units may permit the UAV to move along one or more dimensions. For example, the UAV may be able to move upwards due to the lift generated by one or more rotors of the propulsion units. In some instances, based on the thrust or lift provided by the propulsion units, the UAV may be capable of moving along a Z axis (which may be up relative to the UAV orientation), an X axis, and/or a Y axis (which may be lateral). The UAV may be capable of moving along one, two, or three axes that may be orthogonal to one another. For example, the UAV may move along one or more of a yaw, a roll, or a pitch axis.

The propulsion units may include a plurality of rotors when the UAV is a multi-rotor craft. The plurality of rotors may be capable of rotating to generate lift for the UAV. The rotors may permit the UAV to take off and/or land vertically or to move about freely through the air. In some embodiments, the rotors may rotate at the same rate and/or may generate the same amount of lift or thrust for the UAV. In some embodiments, the rotors may optionally rotate at varying rates, which may generate different amounts of lift or thrust and/or permit the UAV to rotate. In some instances, one, two, three, four, five, six, seven, eight, nine, ten, or more rotors may be provided on a UAV. The rotors may be arranged so that their axes of rotation are parallel to one another. In some instances, the rotors may have axes of rotation that are at any angle relative to one another, which may affect the motion of the UAV.

The output to the propulsion units may be maintained and/or adjusted by the flight control module such that a vertical position and/or velocity of the UAV may be controlled accordingly. For example, increasing the speed of rotation of one or more rotors of the UAV may aid in causing the UAV to increase in altitude or increase in altitude at a faster rate, or increase the thrust of the rotors. Conversely, decreasing the speed of rotation of one or more rotors of the UAV may aid in causing the UAV to decrease in altitude, decrease in altitude at a faster rate, or decrease the thrust of the one or more rotors. When a UAV is taking off, the output provided to the propulsion units may be increased from its previous landed state. When the UAV is landing, the output provided to the propulsion units may be decreased from its previous flight state. The UAV may be configured to take off and/or land in a substantially vertical manner.

A set of rotor blades are mounted to and supported by the one or more rotors of the propulsion units via one or more rotor head assemblies. The rotor head assemblies may be secured to a corresponding rotor shaft by an appropriate attachment mechanism, such as linkages. In some instances, the rotor blades may be fixedly connected to the rotor head assemblies. In some other instances, the rotor blades may be detachably connected to the rotor head assemblies. For example, the rotor blades may be mounted to the rotors by a threaded connection, a locking connection or a clamping connection. The rotor blades may be foldable or retractable in any suitable manners so as to maintain a stowed position prior to the deployment. In addition, the rotor blades may be made of an appropriate lightweight and durable material such as carbon fiber. In some embodiments, the rotor blades may be propeller blades and may also be received into the compartment when the UAV is not in flight or not in operation.

The landing gears may be configured to be foldable or retractable relative to the central body. In some embodiments, the landing gears may be rotatable relative to the central body such that they can be received above or underneath the central body. In some embodiments, the landing gears may be pivotally connected with the central body via one or more joints such that they can be folded against the bottom portion of the central body, to result in a flat/planar profile that further reduces the space occupied by the UAV. In some embodiments, the landing gears may be automatically retracted under the central body or into the compartment after the UAV takes off or reaches a given height. In some embodiments, the landing gears may be manually disconnected from the central body and then placed into the compartment for easy transport.

The component 112 may be a payload that is supported or carried by the central body. In some embodiments, the payload may be an imaging device, such as a camera for aerial photography. In this case, the component 114 may be a gimbal for supporting and connecting the camera to the central body. The gimbal may comprise one or more gimbal components that may be movable relative to one another. The gimbal components may move relative to one another with aid of an actuator. Each gimbal component may optionally have a corresponding actuator that may permit the movement of the gimbal component. In some instances, one or more gimbal components may permit rotation of the payload about a pitch axis, one or more gimbal components may permit rotation of the payload about a yaw axis, and one or more gimbal components may permit rotation of the payload about a roll axis. In some instances, depending on a selected mode, the gimbal components may be individually controlled to provide a desired stabilization effect. For instance, a first gimbal component may be stabilized while a second and a third gimbal components are not stabilized. In another instance, a first gimbal component and a second gimbal component may be stabilized, while the third gimbal component is not stabilized. In another example, the first, the second, and the third gimbal components may all be stabilized. The payload may directly contact a single gimbal component. Alternatively, the payload may directly contact multiple gimbal components.

According to the embodiments of the disclosure, an operational state of the vehicle (e.g., UAV) may change when different types of components are selectively received in the compartment. For example, when a first type of components is selected to be received in the compartment, as shown by an arrow 116, and then a second type of components is being pushed out of the compartment, as shown by an arrow 118, the UAV may switch from a second operational state to a first operational state. The UAV may be powered on and/or in motion when it is in the first operational state. The UAV may be powered off and/or remain dormant when it is in the second operational state. In some embodiments, the first type of components may comprise a battery unit or a flight control module that can allow the UAV to operate and be capable of flight. The second type of components may comprise a payload (e.g., a camera) with a carrier (e.g., a gimbal) for supporting and driving the rotation of the payload. When the second type of components is being received or retracted into the compartment, as shown by an arrow 120, and the first type of components is being extended or pushed out of the compartment, as shown by an arrow 122, the UAV may switch from the first operational state (powered on and/or in motion) to the second operational state (powered off and/or dormant).

In some embodiments, the first type of component may include one or more arms, which may be manually or automatically folded into the compartment. When the one or more arms are received into the compartment, the UAV may enter into the second operational state (e.g., powered off or not in operation). Conversely, when the one or more arms are pushed or extended out of the compartment, the UAV may switch from the second operational state and enter into the first operational state (e.g., powered on or in operation).

The retraction, receiving, removing or extending of the components may be implemented in a manual, semi-automatic, or fully automatic manner, or any combination thereof. For example, an operator may manually push a component out of the compartment so that another component can be inserted into the compartment. In some embodiments, the operator may only need to move a component to a threshold position. When the threshold position has been reached, the component may be automatically pushed into or pushed out of the compartment by an actuator mechanism or a driving unit. In some embodiments, one or more sensors may be arranged on an internal wall of the compartment. The sensors may be configured to detect the retraction of a component into the compartment and/or the pushing of another component out of the compartment. Accordingly, the sensors can generate a trigger signal for triggering one or more components to be pushed out of the compartment or retracted into the compartment.

In some embodiments, the compartment may be configured to simultaneously accept or receive a plurality of components. To this end, the compartment may be segmented into a plurality of sections, such as sections 108-1, 108-2, 108-3 with two openings 109-1 and 109-2 as shown at Part B of FIG. 1 and sections 108-4, 108-5, and 108-6 with two openings 109-3 and 109-4 as shown at Part C of FIG. 1. As shown part B, three sections 108-1, 108-2, and 108-3 may be parallel to one another in a horizontal direction and each section may receive a component retracted or inserted in a vertical direction from the opening 109-1 or 109-2. As shown in Part C, three sections 108-4, 108-5, and 108-6 may be parallel to one another in a vertical direction and each section may receive a component retracted or inserted in a horizontal direction from the opening 109-3 or 109-4.

Based on the above multiple-section arrangement, two or more components may be received at the same time. In some implementations, one or more components may be allowed to move between these sections during the retraction and/or extension of the other components. In an example, when a first component from the plurality of components is moved within the compartment, a space may be generated within the compartment for accepting a second component from the plurality of components. In another example, when a first component from the plurality of components is pushed out of the compartment by a second component from the plurality of components, a space may be generated within the compartment for accepting a third component from the plurality of components.

In some embodiments, when a first component from the plurality of components is partially moved out of the compartment, a space may be generated within the compartment for fully or partially accepting a second component from the plurality of components. In this case, the second component may be configured to push the first component out of the compartment such that the second component is completely accepted within the compartment.

In some embodiments, insertion or retraction of a first component into the compartment may cause a second component within the compartment to be extended or pushed out, thereby changing the operational state of the UAV. In some instances, the first component may be a battery unit for powering the UAV when the battery unit is inserted or retracted into the compartment. Alternatively, the first component may be a flight control module for controlling flight of the UAV when the flight control module is inserted or retracted into the compartment. The second component may be a payload and/or carrier. In some instances, the payload and/or carrier may be inserted or retracted into the compartment to push the battery unit out of the compartment such that the power to the UAV, the payload and/or the carrier is terminated, thereby changing the operational state of the UAV to a powered off and/or dormant state. Conversely, the battery unit may be inserted or retracted into the compartment to push the payload and/or carrier out of the compartment, such that the battery unit powers at least one of the payload, the carrier and/or the vehicle.

Based on the foregoing description with reference to FIG. 1, it is to be understood that the compartment according to embodiments of the disclosure can improve the utilization of an internal space of the vehicle chassis of a vehicle and enhance the mobility and transportation of the vehicle.

Figure 2:
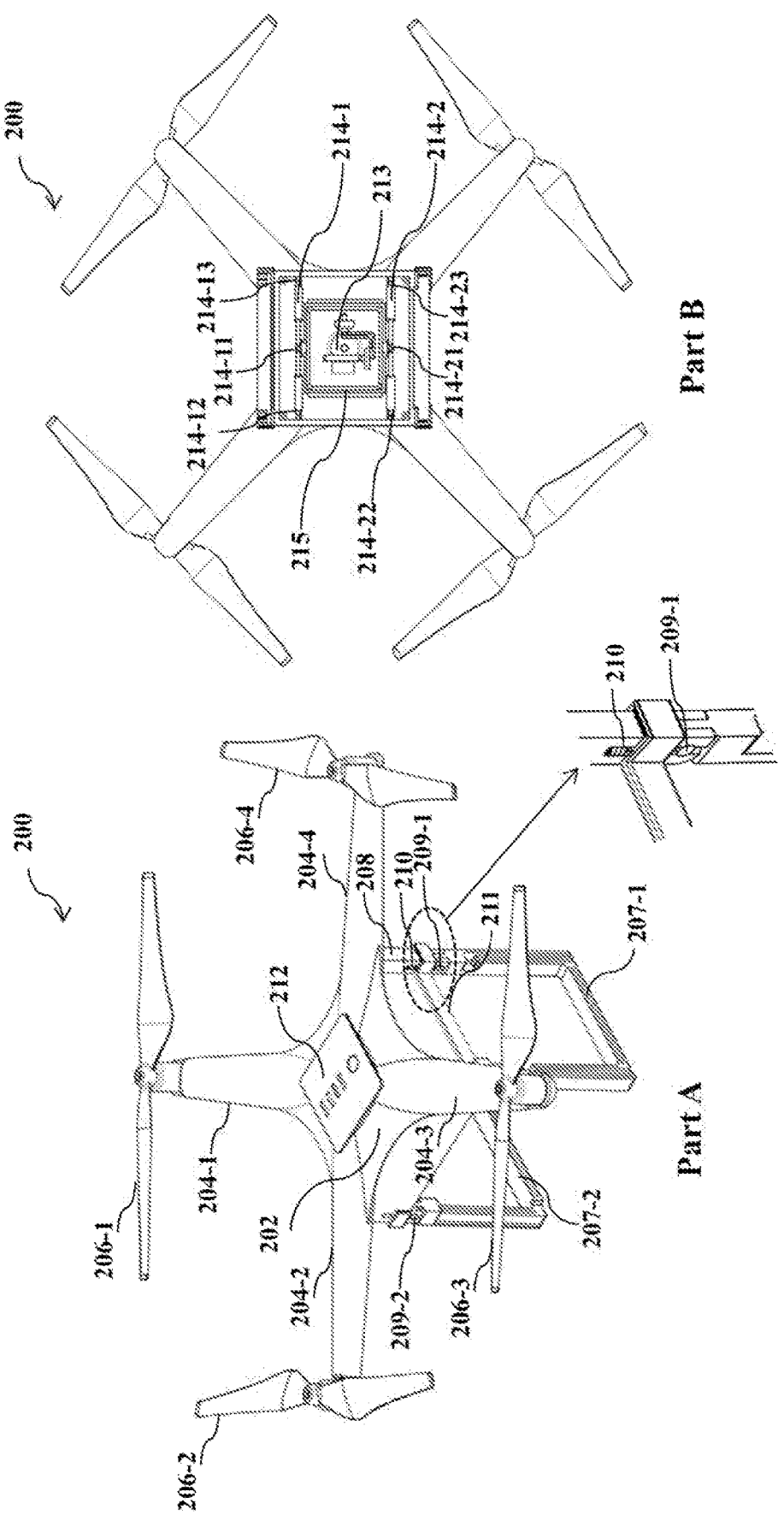
FIG. 2 illustrates different schematic views of an unmanned aerial vehicle (UAV) comprising a multi-functional compartment, in accordance with embodiments of the disclosure.

FIG. 2 illustrates different schematic views of an unmanned aerial vehicle (UAV) comprising a (multi-functional) compartment, in accordance with embodiments of the disclosure. It should be noted that the UAV in FIG. 2 may be considered to be a specific form of a vehicle. Also, the compartment in FIG. 2 may be similar to the one shown in FIG. 1. Therefore, the description about the vehicle and the compartment in FIG. 1 may be applicable to the UAV and compartment in FIG. 2 as described below.

As shown in Part A of FIG. 2, a UAV 200 may comprise a central body 202, which may serve as a part of a main body of a vehicle chassis, and a plurality of arms, such as 204-1, 204-2, 204-3, and 204-4. A proximal end of each arm 204 may be movably coupled to the central body 202 via a connecting mechanism (not shown) or integrally formed therewith as shown. A distal end of each arm may be coupled to and support one or more propulsion units, such as 206-1, 206-2, 206-3, and 206-4. Each of the one or more propulsion units may be attached to a motor. A shaft of the motor may drive a propeller to rotate, thereby providing lift and thrust to enable UAV to move in one or more directions, or rotate in one or more rotation of axes, such as in a pitch, a yaw, and/or a roll axis. The wiring in a propulsion system or unit (e.g., a brushless motor) may be routed through each arm to connect to different units or systems (e.g., a flight control system or an Electronic Speed Control unit (ESC)) of the UAV. The flight control system or the ESC may be configured to vary the speed of the one or more motors.

The UAV may further comprise one or more foldable or retractable landing gears, such as 207-1 and 207-2, which may movably connected to the central body via connecting bars 208. In some embodiments, the landing gear and connecting bar may be hingedly connected about a joint, such as 209-1 and 209-2. One or more elastic or resilient members, such as a spring 210 may be arranged within a groove of the connecting bar. The groove may be of a cylindrical shape to accommodate the spring. As shown, one end of the spring may abut against the top end of the groove and another end of the spring (i.e., a free end) may abut against an upper side of a landing gear fastener 211. The landing gear fastener may move in a vertical direction until it abuts against the joint 209-1. Accordingly, the joint can connect the connecting bar and the landing gear, and also stop or limit the movement of the landing gear fastener and prevent it from falling off.

In some implementations, the landing gear fastener may be horizontally secured to the connecting bar, and may move in a vertical direction. In this manner, the landing gears may be secured in the extended configuration (as shown in Part A of FIG. 2) and in a folded configuration (as shown in Part A of FIG. 5). For example, in the folded configuration, the landing gear fastener may be pushed by the spring to lock onto a landing gear fixing groove 213 (as shown in Part A of FIG. 5), such that the landing gear remains stable in the folded configuration.

To reduce the thickness of the UAV after folding, the respective structures of the landing gears should be complementary to each other such that they fit with each other and have less thickness after being folded together. For example, one of the landing gears may be arranged with elongated grooves and another one of the landing gears may be arranged with elongated tongues, thereby resulting in an interlocking and compact structure.

A compartment may be arranged at a center of the central body. A battery unit 212 (e.g., an intelligent rechargeable battery) has been received, retracted or pushed into the compartment. In some embodiments, the compartment may be configured to have an upper opening located at the top of the compartment. The battery unit may be inserted into the compartment from the upper opening, which causes a gimbal, such as a three-axis gimbal 213, to be pushed out from the compartment, as shown in Part B of FIG. 2.

The gimbal may be configured to move vertically within the compartment. In some embodiments, the gimbal may be limited by or may travel along guiding rails with linear square grooves arranged on the inner wall of the compartment. The movement of the gimbal, e.g., vertical translation as shown, may be driven by one or more driving units, such as a pneumatic actuator 214. As shown, the pneumatic actuator 214 herein may comprise two air-supported linkage mechanisms 214-1 and 214-2 which are arranged symmetrically with one another. Each of the air-supported linkage mechanisms may comprise a hinged end, such as 214-11 and 214-21 and two connecting ends, such as (214-12, 214-13) and (214-22, 214-23). The hinged end may be used for connecting two constituent members of the air-support linkage mechanism. Further, the hinged end may be used to securely connect with the gimbal such that the pneumatic actuator may drive the gimbal to move in the vertical direction. The connecting ends may be used to couple the air-supported linkage mechanisms to the central body, such as two opposite internal walls of the compartment. In this way, when a first component (e.g., a battery unit) is selected to be received into the compartment, a second component (e.g., a gimbal with an imaging device) may be pushed out of the compartment, as discussed in detail with reference to FIG. 3.

In some embodiments, a circuit board 215 may be further arranged around the internal walls of the compartment. The circuit board may comprise various modules, including but not limited to a flight control module, a speed control module, data processing module and the like. In some embodiments, an inertial navigation module (not shown) may be mounted on the top of the gimbal such that the inertial navigation module is capable of moving upward or downward with the gimbal. The inertial navigation module may include but is not limited to an inertial measurement unit (IMU), an electronic compass, a global positioning system (GPS), or the like that is sensitive to the locations and capable of collecting location-related data for location-based services, such as location determination.

Figure 3:
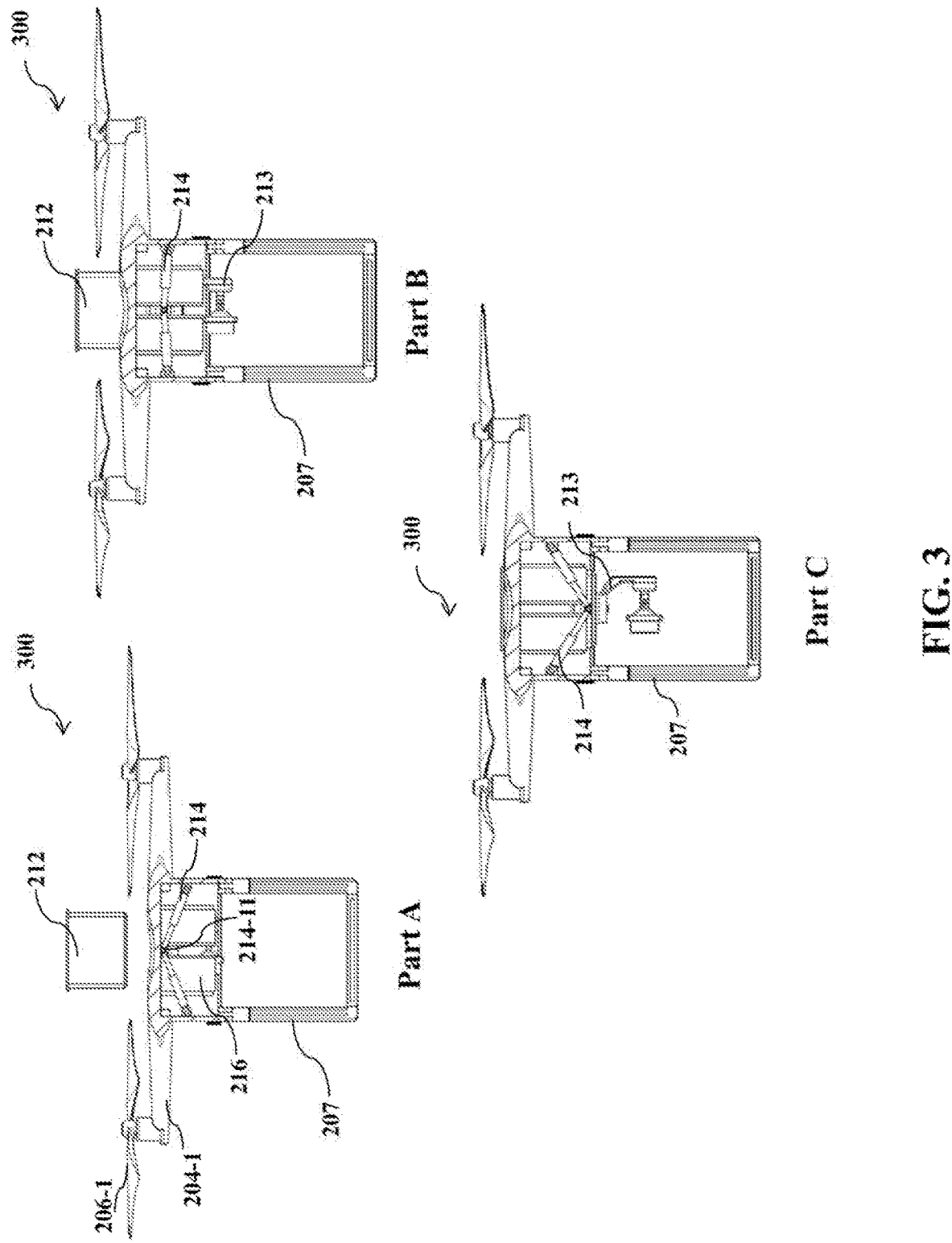
FIG. 3 illustrates different schematic views of a UAV as a component is being inserted into a multi-functional compartment of the UAV, in accordance with embodiments of disclosure.

FIG. 3 illustrates different schematic views of a UAV as a component is being inserted into a multi-functional compartment of the UAV, in accordance with embodiments of disclosure. It should be noted that the UAV as shown in FIG. 3 may be similar to those shown in FIG. 2. Thus, the same reference numbers may refer to the same elements and the description made with reference to FIG. 2 may be applicable to the UAV 300 as described below.

As shown in Part A of FIG. 3, a second component or a second type of component (e.g., a gimbal) has been received in a compartment 216 via an actuator mechanism (e.g., the pneumatic actuator 214), with the pneumatic actuator being in a retracted configuration. Since a first component or a first type of component (e.g., a battery unit 212) has been pushed out of the compartment due to the retraction of the gimbal, the UAV may switch from a first operational state (e.g., powered on or in operation) to a second operational state (e.g., powered off or not in operation). When the UAV is in the second operational state, the UAV may cease operation and may be at rest. In some embodiments in which the first component is not a battery unit for powering the whole UAV, the retraction of the second component (e.g., gimbal) into the compartment may trigger the UAV to switch into a third operational state, for example, a standby state or a sleep state.

As shown in Part B of FIG. 3, when the first component (e.g., the battery unit) is selected to be pushed or received into the compartment, the pneumatic actuator begins to extend downward due to the pressure from the first component. The downward movement of the pneumatic actuator may further cause the gimbal to move in a vertical direction until the gimbal is completely pushed out of the compartment, as shown in Part C of FIG. 3. During this actuation process, the pneumatic actuator can transform between a retracted configuration and an extended configuration. For example, the pneumatic actuator may be in the retracted configuration when the gimbal is fully received in or pushed out of the compartment. The pneumatic actuator may be in the extended configuration when the hinged end reaches at a predetermined position, for example, at a half of a stroke length of the pneumatic actuator. Since the hinged ends of the pneumatic actuator may be able to move substantially along the vertical length of the compartment, it may abut against an upper internal wall and a bottom internal wall of the compartment, which causes the base of the gimbal to be held in a rigid position.

In some cases, when the first component (e.g., battery unit) is about to be pulled or extended out of the compartment, an operator may initially push the second component (e.g., gimbal) upward to trigger the movement of the pneumatic actuator. When the pneumatic actuator reaches half of its stroke length, the remaining operation may be automatic. For example, the pneumatic actuator may automatically transform from the extended configuration (e.g., at half of the stroke length) to the retracted configuration (whereby the hinged end of the pneumatic actuator abuts against the upper internal wall of the compartment). When the pneumatic actuator is in the retracted configuration, the battery unit may be fully extended or pushed out of the compartment. Subsequently, the UAV may switch to the second operational state (for example, powered off or not in operation) as a result of the removal of the battery unit from the compartment.

It should be understood that the pneumatic actuator described herein is merely exemplary and the disclosure is not limited thereto. In some embodiments, instead of using the pneumatic actuator, other transmission mechanisms, linkage mechanisms, or actuator mechanisms may be used for moving the components into or out of the compartment. For example, a guiding mechanism including guiding rails may be used to pull or push the components in or out of the compartment. Alternatively, a chain mechanism including one or more chains may be used to move the components in or out of the compartment. In some embodiments, an elastic mechanism including one or more elastic members or elastomers may be applied to move the components in or out of the compartment. In some embodiments, the movement of the components in or out of the compartment may be driven by one or more driving units, including one or more motors. In this way, the rotation of the motor may cause the components to move into or move out of the compartment, in conjunction with one or more mechanism described above.

In some embodiments, one or more circuitries or circuit units may be arranged in the compartment. The circuit units may include electric contacts, electrical interfaces, various ports, pins, slots and the like. In this manner, when the components with electrical interfaces are retracted or pushed into the compartment, the circuits within the compartment may be closed or connected, and different functions may be triggered or activated, thereby allowing the UAV to change/switch its operational states. For example, after the battery unit is pushed into the compartment, based on the electrical connection established between the battery unit and a flight control unit via closed electrical contacts, the UAV may be powered on automatically or upon receiving an operator's command signal.

Figure 4:
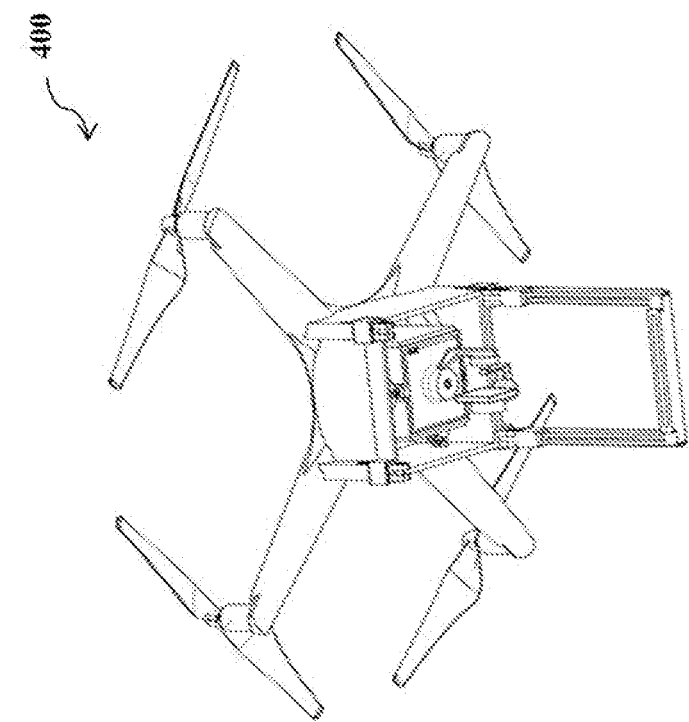
FIG. 4 illustrates different schematic views of a UAV after a component has been fully inserted into a multi-functional compartment of the UAV, in accordance with embodiments of the disclosure.
Figure 4:
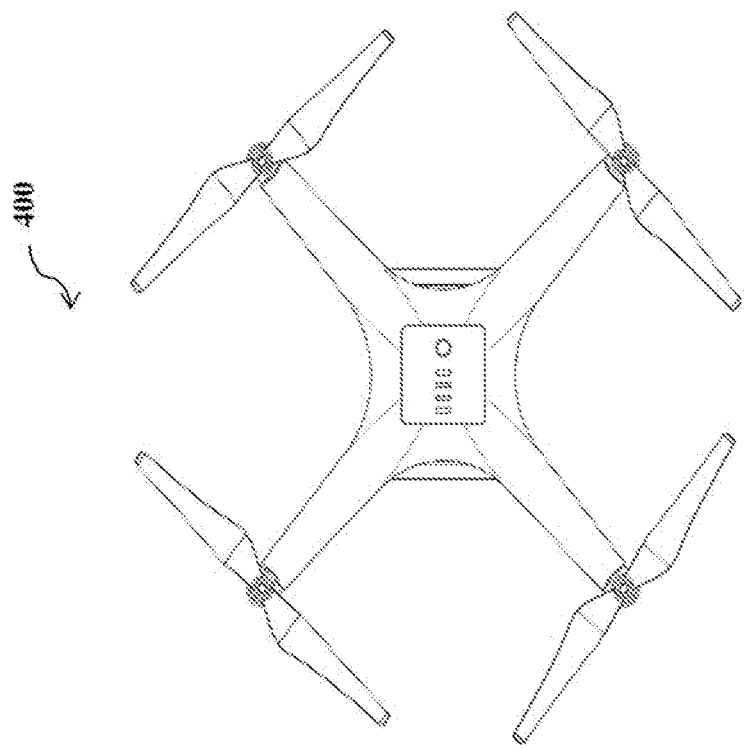

FIG. 4 illustrates different schematic views of a UAV after a component has been fully inserted into a multi-functional compartment of the UAV, in accordance with embodiments of the disclosure. It should be noted that the UAV 400 shown in FIG. 4 may be similar to the one shown in FIG. 3 and therefore the description made with reference to FIG. 3 may be applicable to the UAV 400 as described below.

Part A of FIG. 4 illustrates a top view of the UAV 400 after a first component (e.g., a battery unit) has been inserted, pushed or retracted into a compartment that is located at a central body of the UAV 400. Part B of FIG. 4 illustrates a bottom view of the UAV 400. In the interest of clarity, a landing gear has been omitted from Part B of FIG. 4 to reveal more details of the second component (e.g., a gimbal) under the compartment. The gimbal as shown has been pushed out of the compartment due to the insertion of the battery unit into the compartment. Accordingly, the UAV may transform its operational state from a powered off state to a powered on state and may be ready for operation, such as performing a real flight.

Figure 5:
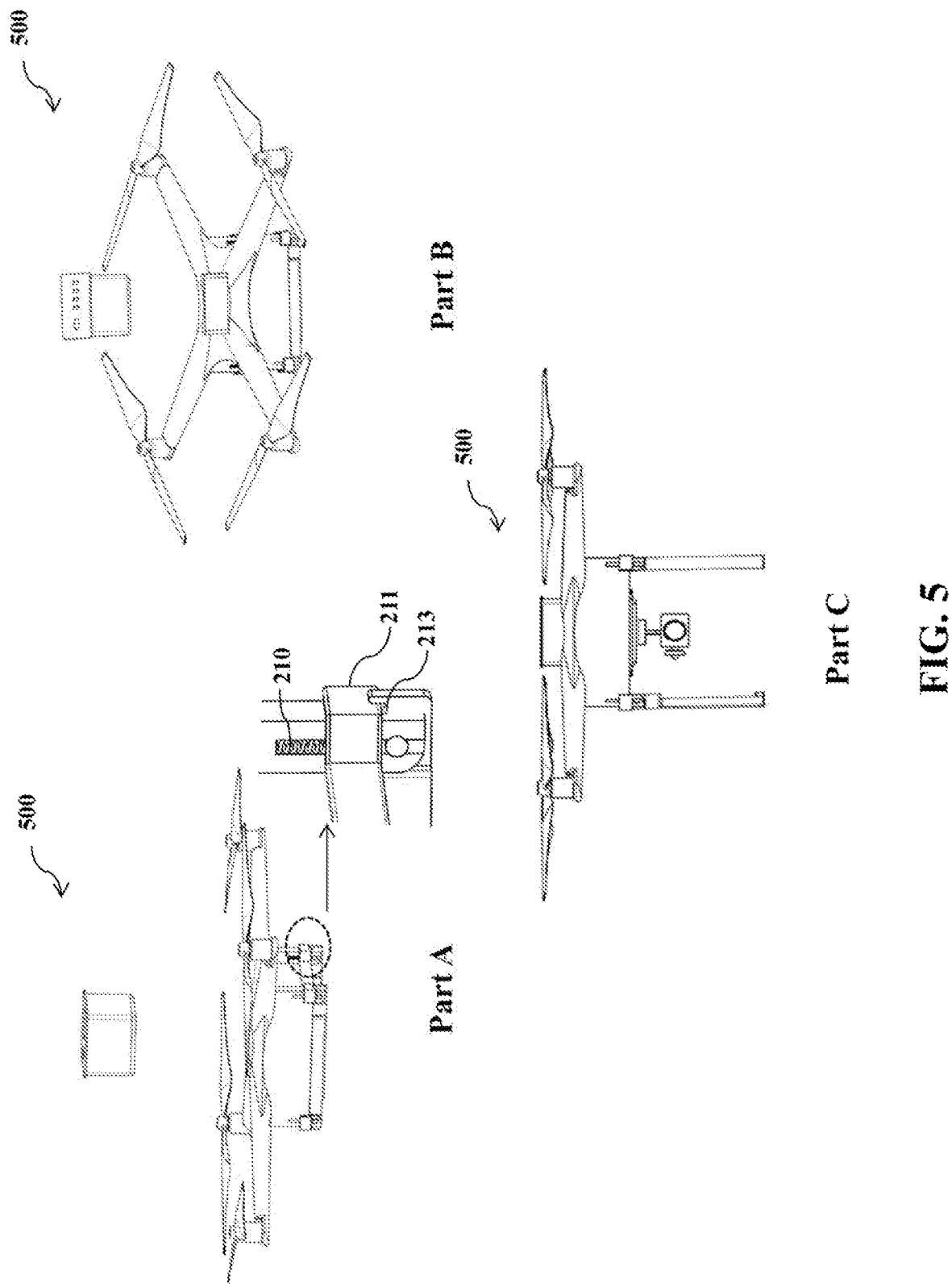
FIG. 5 illustrates different schematic views of a UAV comprising a multi-functional compartment and foldable landing gears, in accordance with embodiments of the disclosure.

FIG. 5 illustrates different schematic views of a UAV comprising a multi-functional compartment and foldable landing gears, in accordance with embodiments of the disclosure. It should be noted that the UAV 500 shown in FIG. 5 may be similar to those shown in FIGS. 2-4. Thus, the same reference numbers may refer to the same elements and the description made with reference to FIGS. 2-4 may be applicable to the UAV 500 as described below.

Part A of FIG. 5 illustrates a perspective view of the UAV 500 as its landing gears are folded towards one another. As described before with reference to FIG. 2, the landing gear fastener 211 may be pushed by the spring 210 to lock onto the landing gear fixing groove 213 as shown, such that the landing gear remains stable in the folded configuration. Further, due to the interlocking structure (in which the elongated grooves arranged in one landing gear and the elongated tongues arranged in another landing gear are engaged with one another), the folded landing gears may result in the UAV having a flat/planar profile, thus reducing the space occupied by the UAV.

To reduce the thickness of the UAV after folding, the respective structures of the landing gears may be complementary to each other such that they fit with each other and result in less thickness after the folding.

Part B of FIG. 5 illustrates another perspective view of the UAV 500 with a different angle of view from Part A. As shown in Part B, the landing gears are folded under the compartment and the battery unit is about to be pushed into the compartment. As a result of the insertion of the battery unit, the gimbal may be pushed out of the compartment using one or more driving units, such as the pneumatic actuator, as previously described. Part C of FIG. 5 illustrates the battery unit being pushed or inserted into the compartment. For example, in some instances, when nearly ½, ⅓, ¼, ⅕ or ⅙ of the battery unit has been inserted into the compartment, the gimbal may be moved out of the compartment automatically. In some embodiments, the operational state of the UAV may be changed even though the battery unit has not yet been fully received into the compartment. This may occur when the electrical contact between the battery unit and the compartment is located near the entrance of the compartment. In some cases, the UAV may be powered on due to the electrical connection, and the gimbal may then be automatically pushed out of the compartment.

Figure 6:
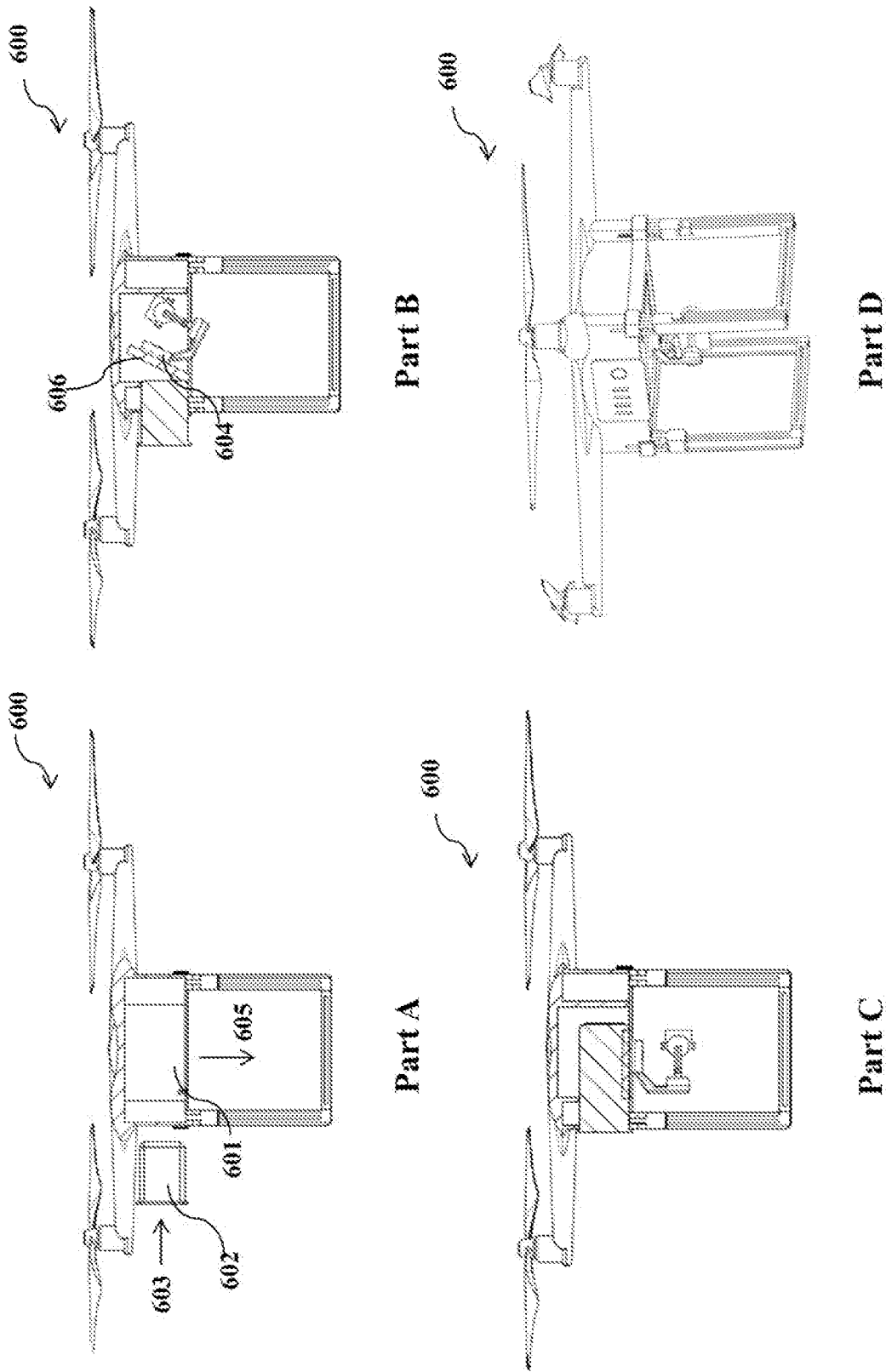
FIG. 6 illustrates different schematic views of a UAV as a component is being inserted into a multi-functional compartment from a horizontal direction, in accordance with embodiments of the disclosure.

FIG. 6 illustrates different schematic views of a UAV as a component is being inserted into a multi-functional compartment of the UAV from a horizontal direction, in accordance with embodiments of the disclosure. It should be noted that the UAV 600 may be similar to the UAVs as described elsewhere herein, except the UAV 600 may have a different compartment arrangement. Therefore, unless indicated otherwise, the descriptions about the UAVs with reference to FIGS. 2-5 may also be applicable to the UAV 600 as described below.

The compartment 601 may receive a first component 602 (e.g., a battery unit) horizontally instead of vertically, as indicated by an arrow 603. When the first component is inserted into the compartment horizontally, a second component (e.g., a gimbal) 604 may be vertically pushed out of the compartment, as indicated by an arrow 605. It can be seen that the compartment 601 is configured to have two openings facing towards different directions, forming two mutually-orthogonal passageways. In this way, the first component may be inserted into or pushed out of the compartment in a first direction, and the second component may be retracted into or pushed out of the compartment in a second direction different from the first direction. The use and arrangement of the orthogonal passageways can allow the compartment to be designed in different configurations. In some embodiments, the axes of the compartment and passageways may be perpendicular or parallel to an axis of the central body, such as a yaw axis of the UAV. In some other embodiments, the axes of the compartment and passageways may be tilted relative to the axis of the central body.

Part B of FIG. 6 illustrates more details about the movement of the gimbal within the compartment. As shown in Part B, the gimbal may be coupled to a mounting plate 606. The mounting plate may be moveably connected with a bottom side of the internal wall of the compartment. In some embodiments, the gimbal may be coupled to the mounting plate using one or more of fasteners, actuation elements, joints, hinges, bolts, screws, etc. Further, the mounting plate may be movably secured within the compartment using a pivotal connection, a hinged connection, a bearing connection and the like.

As the battery unit moves into the compartment, the gimbal may be rotatably pushed out of the compartment as shown in Part B and Part C of FIG. 6. After the gimbal fully moves out of the compartment and the battery unit is inserted into the compartment, the operational state of the UAV may switch immediately. Further, the UAV may be powered on and undergo certain routines, such as self-checking, location determination, exception monitoring or the like. Part D of FIG. 6 illustrates a perspective view of the UAV 600. As shown, the battery unit has been laterally inserted into the compartment and the gimbal has been located underneath the compartment. In this manner, the battery unit may be easier to access.

It is to be understood that the locations and arrangements of the openings of the compartment according to the embodiments of the disclosure can be designed and configured in various configurations. In the example of FIG. 6, the gimbal is rotated downward and then pushed out of the compartment. In some other embodiments, the gimbal may be rotated upward and then pushed out of the compartment, such that an imaging device supported by the gimbal may be able to perform shooting with a high angle of elevation. Further, in some embodiments, the gimbal may be laterally pushed out of the compartment, such that the gimbal may be located near one side of the central body instead of below the central body. In this way, the imaging device coupled to the gimbal may obtain a clear unobstructed view when shooting, without the landing gears entering into the field of view of the imaging device.

Figure 7:
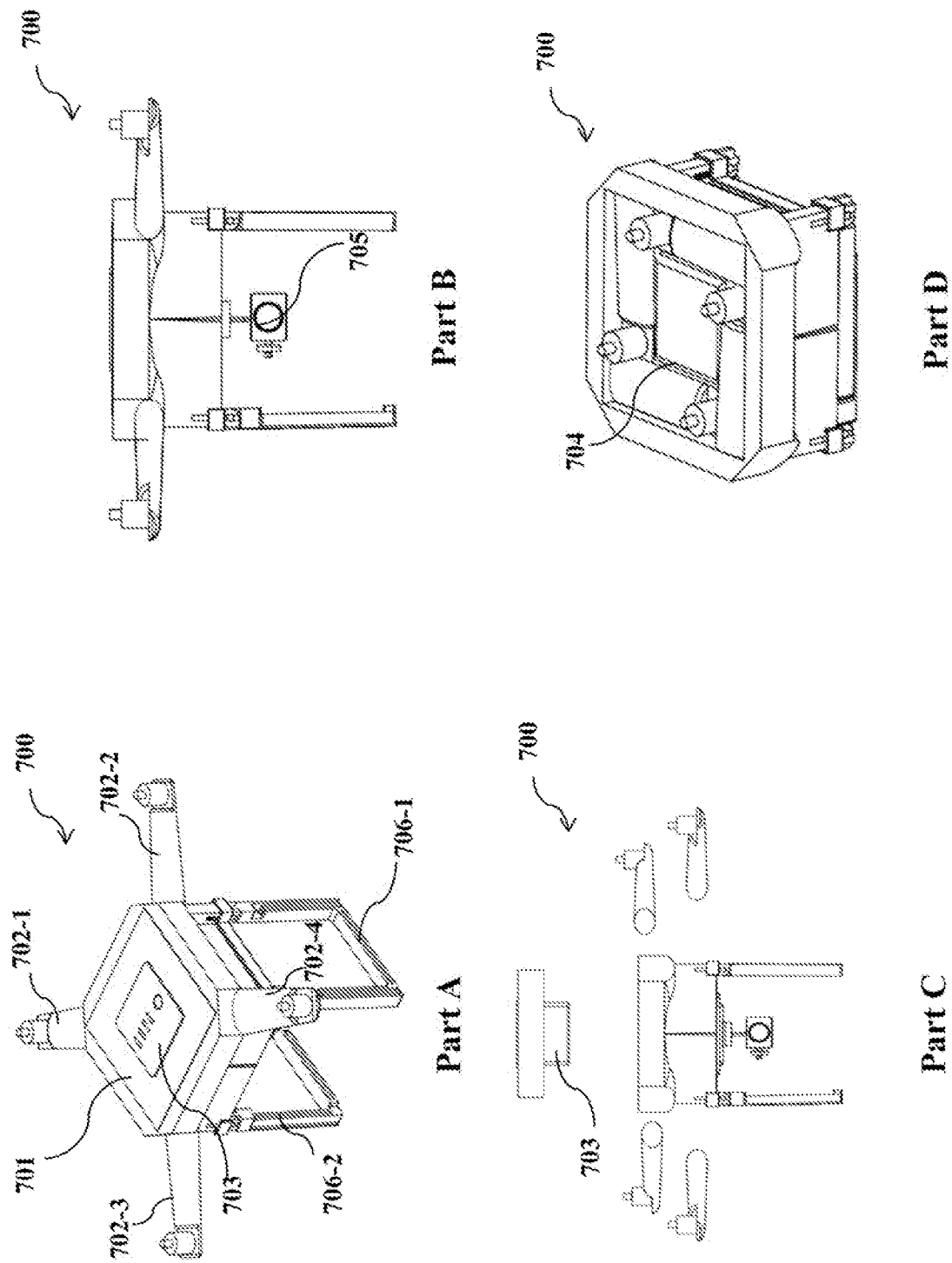
FIG. 7 illustrates different schematic views of a UAV as its releasable arms are placed into a multi-functional compartment of the UAV, in accordance with embodiments of the disclosure.

FIG. 7 illustrates different schematic views of a UAV as its foldable arms are placed into a multi-functional compartment of the UAV, in accordance with embodiments of the disclosure. It should be noted that the UAV 700 shown in FIG. 7 may be similar to those as described before with reference to FIGS. 1-6, except that the UAV 700 comprises releasable or removable arms. Therefore, unless indicated otherwise, the description made about the UAV with reference to FIGS. 1-6 may be applicable to the UAV 700 as described below.

As shown in Part A of FIG. 7, the UAV 700 may comprise a central body 701 and a plurality of releasable arms, such as 702-1, 702-2, 702-3, and 702-4. In some embodiments, the plurality of releasable arms may be coupled to the central body via one or more actuation mechanisms, including one or more motors, e.g., servo motors. In some embodiments, the plurality of releasable arms may be hingedly connected with the central body. Further, in some embodiments, the plurality of releasable arms may be connected with the central body using a variety of mechanical members, such as fasteners, actuators, joints, hinges, bolts, screws, etc.

The central body may further comprise a compartment, such as 704 shown in Part D of FIG. 7, in which a first component, for example, a battery unit 703 has been received. The UAV may further comprise one or more foldable landing gears, such as 706-1 and 706-2, which may be similar to those shown in FIGS. 2-6.

Part B of FIG. 7 illustrates a front view of the UAV in which a second component, such as a gimbal 705 supporting an imaging device, has been pushed out of the compartment. Although one or more motor assemblies are illustrated without one or more rotor propellers coupled thereon in FIG. 7, it can be understood that the UAV in this configuration may still be operable to enable some procedures, such as a self-checking procedure or an update procedure, in which the propulsion units may or may not need to be involved. To this end, an operator may turn on the UAV by pressing a start button on the UAV or on a remote controller to start the UAV. In some embodiments, in order for a real flight, the operator may manually mount the rotor propellers on the motor assemblies, e.g., via a quick release mechanism.

Part C of FIG. 7 illustrates that the releasable arms of the UAV have been released from the central body and the battery unit has been pushed out of the compartment. This may be done in manners as previously described. For example, by using the pneumatic actuator, the gimbal may be pulled into the compartment which causes the battery unit to be pushed out of the compartment. This process may be initiated by a manual operation and then automatically performed until the gimbal (in some cases with an imaging device) is fully received within the compartment. Due to the removal of the battery unit, the UAV may switch its operational state from a powered on state to a powered off state. The released arms may also be placed into or received within the compartment, as shown in Part D of FIG. 7. The released arms may be placed around the received gimbal such that the arms and gimbal may share the same compartment, thereby improving the portability of the UAV. In some embodiments, by properly selecting the thickness of the battery unit and the central body, all of the battery unit, the releasable arms and the gimbal may share the same compartment, thereby further improving the portability of the UVA and enhancing the usage of the compartment. Accordingly, the compartment according to the embodiments of the disclosure may be shared by more than one component at any given time.

The above embodiments of the disclosure have been described using a UAV as an example of a vehicle. Any description herein with regards to the UAV may apply to any type of movable object. The description of a UAV may apply to any type of unmanned movable object (e.g., which may traverse the air, land, water, or space). The UAV may be capable of responding to commands from a remote controller. The remote controller may be not physically connected to the UAV but may communicate with the UAV wirelessly from a remote distance. In some instances, the UAV may be capable of operating autonomously or semi-autonomously.

The UAV may be capable of following a set of preprogrammed instructions regarding folding or unfolding operations of the arms. In some instances, the UAV may operate semi-autonomously by responding to one or more commands from a remote controller while otherwise operating autonomously. For instance, one or more commands from a remote controller may initiate a sequence of autonomous or semi-autonomous actions by the UAV in accordance with one or more parameters. The one or more commands may be formatted or programmed to instruct the UAV to change its operational states immediately or after a while when different components have been received into or pushed out of the compartment. The retraction, receiving, removal, pushing out, and accepting according to various embodiments of the disclosure may be implemented manually, automatically or semi-automatically.

Figure 8:
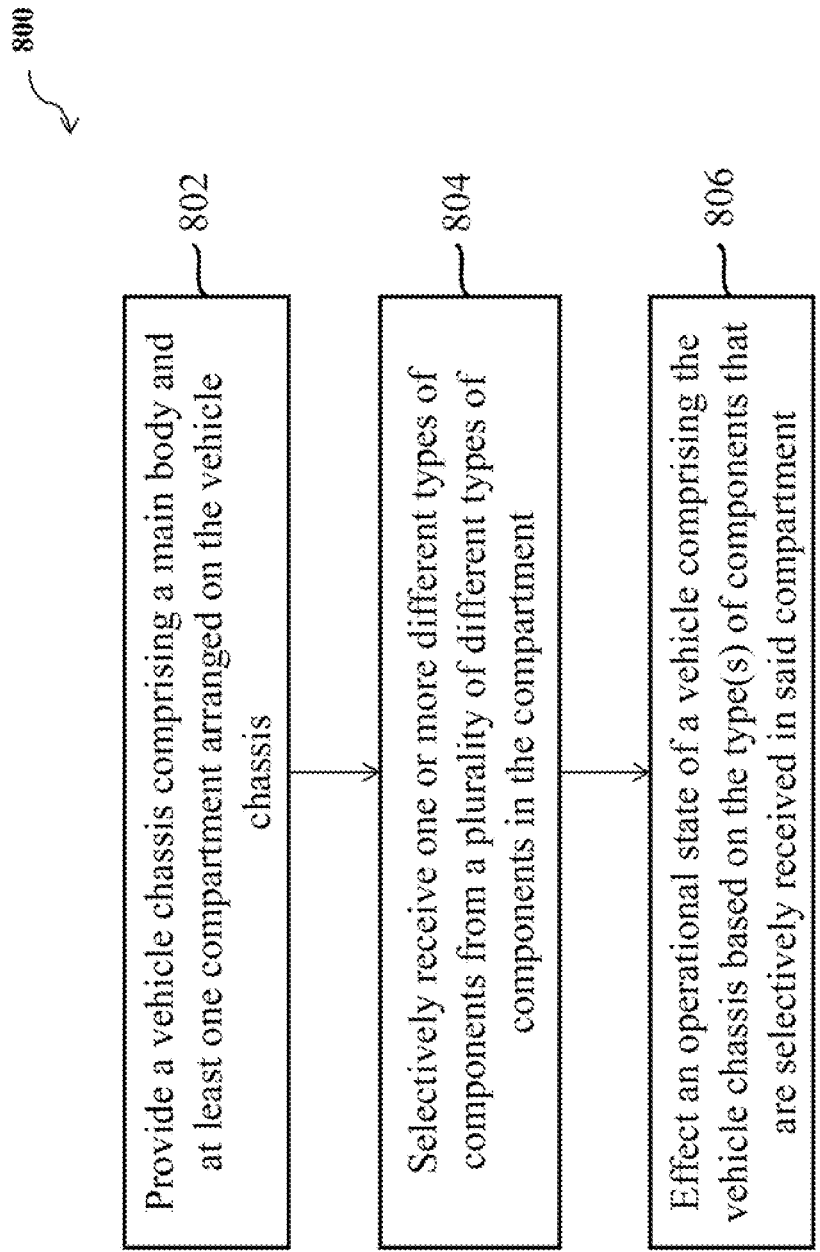
FIG. 8 illustrates a flow chart of a method for operating a vehicle chassis, in accordance with embodiments of the disclosure.

FIG. 8 illustrates a flow chart of a method 800 for operating a vehicle chassis, in accordance with an embodiment of the disclosure.

As shown in FIG. 8, at 802, the method may comprise providing a vehicle chassis comprising a main body and at least one compartment arranged on the vehicle chassis. Then at 804, the method may further comprise selectively receiving one or more different types of components from a plurality of different types of components in the compartment. Finally, at 806, the method may additionally comprise effecting an operational state of a vehicle comprising the vehicle chassis based on the type(s) of components that are selectively received in the compartment.

In some embodiments, the vehicle may be an unmanned aerial vehicle (UAV) as described above with reference to FIGS. 1-7.

In some embodiments, the one or more components may comprise one or more propulsion units configured to provide a lift for the UAV.

In some embodiments, the effecting of the operational state of the vehicle may comprise changing the operational state of the vehicle when different types of components are selectively received in the compartment. In some embodiments, different types of components may be received or retracted into the compartment based on the operational state of the vehicle. In some instances, the vehicle may be in a first operational state when a first type of component is received or retracted into the compartment. For example, the vehicle may be powered on and/or in motion when the vehicle is in the first operational state. In some instances, the vehicle may be in a second operational state when a second type of component is received or retracted into the compartment. For example, the vehicle may be powered off and/or at rest when the vehicle is in the second operational state.

In some embodiments, the first type of components may comprise one or more of a battery unit, a flight control module, and/or landing gears. In some embodiments, the second type of components may comprise one or more of a payload, a carrier configured to support the payload, and/or an arm configured to support a propulsion unit of the vehicle. In some instances, removing or extending out the different types of components from the compartment may be based on the operational state of the vehicle.

In some embodiments, the compartment may be configured to accept only one type of components within its cavity at any given time. In some embodiments, the compartment may be configured to accept multiple different types of components within its cavity at any given time.

In some embodiments, insertion or retraction of one type of component into the compartment may cause another type of component within the compartment to be extended or pushed out. For example, the insertion or retraction of the one type of component into the compartment may trigger the other type of component to be pushed out of the compartment. In some instances, the other type of component may be pushed out of the compartment by a driving unit.

In some embodiments, the extending or pushing of the one type of component out of the compartment may trigger the other type of component to be inserted or retracted into the compartment. In some instances, the other type of compartment may be inserted or retracted into the compartment by a driving unit.

In some embodiments, the insertion or retraction of one type of component may occur in a first direction and the extending or pushing out of another type of component may occur in a second direction that is same or different from the first direction. In some embodiments, the compartment may comprise one or more openings for accepting, removing, retracting, and/or extending different types of components. In some instances, the compartment may be configured to simultaneously receive a plurality of components. In some instances, the compartment may comprise a plurality of sections for simultaneously receiving two or more components. In some instances, the compartment may comprise a plurality of sections for allowing one or more components to move between the plurality of sections during retraction and/or extension of the one or more components.

To improve the usage of an internal space of the compartment, in some instances, when a first component from the plurality of components is moved within the compartment, a space may be generated within the compartment for receiving a second component from the plurality of components. In some instances, when a first component from the plurality of components is pushed out of the compartment by a second component from the plurality of components, a space may be generated within the compartment for receiving a third component from the plurality of components. In some instances, when a first component from the plurality of components is partially moved out of the compartment, a space may be generated within the compartment for fully or partially receiving a second component from the plurality of components.

It should be noted that the method and its various extensions as described above with reference to FIG. 8 are for illustrative purposes, and may incorporate one or more of the embodiments previously described in FIGS. 1 through 7. Additionally, assembly kits corresponding to the respective methods may be provided.

A kit as described herein may be assembled by a user. The kit may be a "do it yourself" (DIY) kit. The kit may comprise a vehicle chassis comprising a main body and at least one compartment arranged on the main body, wherein the compartment is configured to selectively receive one or more different types of components from a plurality of different types of components. The kit may further comprise a propulsion system configured to be operably coupled to the vehicle chassis. The kit may include instructions for a user to assemble the vehicle chassis and the propulsion system to construct a vehicle. The assembled vehicle may be characterized in that an operational state of the vehicle is effected based on the type(s) of components that are selectively received in the compartment. In some embodiments, when the vehicle is an unmanned aerial vehicle (UAV), the kit may include instructions for the user to assemble the UAV having a central body and at least one compartment arranged on the central body. The user can choose to vary the number of arms. The assembled UAV can also have a plurality of rotors, each rotor attached to the one or more joint portions.

In some embodiments, the kit may comprise instructions for assembling the UAV, such that when the UAV is assembled according to the instructions, the resulting UAV may be characterized as having features as described previously. For instance, the resulting UAV may have at least one compartment that may be arranged on the central body for selectively receiving one or more components. Further, the resulting UAV may have releasable arms that may be removed or released from the central body of the UAV and may be mounted or connected back to the central body as necessary. In some instances, the resulting UAV may have foldable landing gears as described before with reference to FIGS. 2-7. In some instances, the foldable landing gears may be folded against each other under the central body of the UAV such that the whole UAV may take a flat structure. In some instances, the foldable landing gears may also be place into the compartment after being mechanically released from the central body. Thereby, the portability of the UAV could be further improved.

Figure 9:
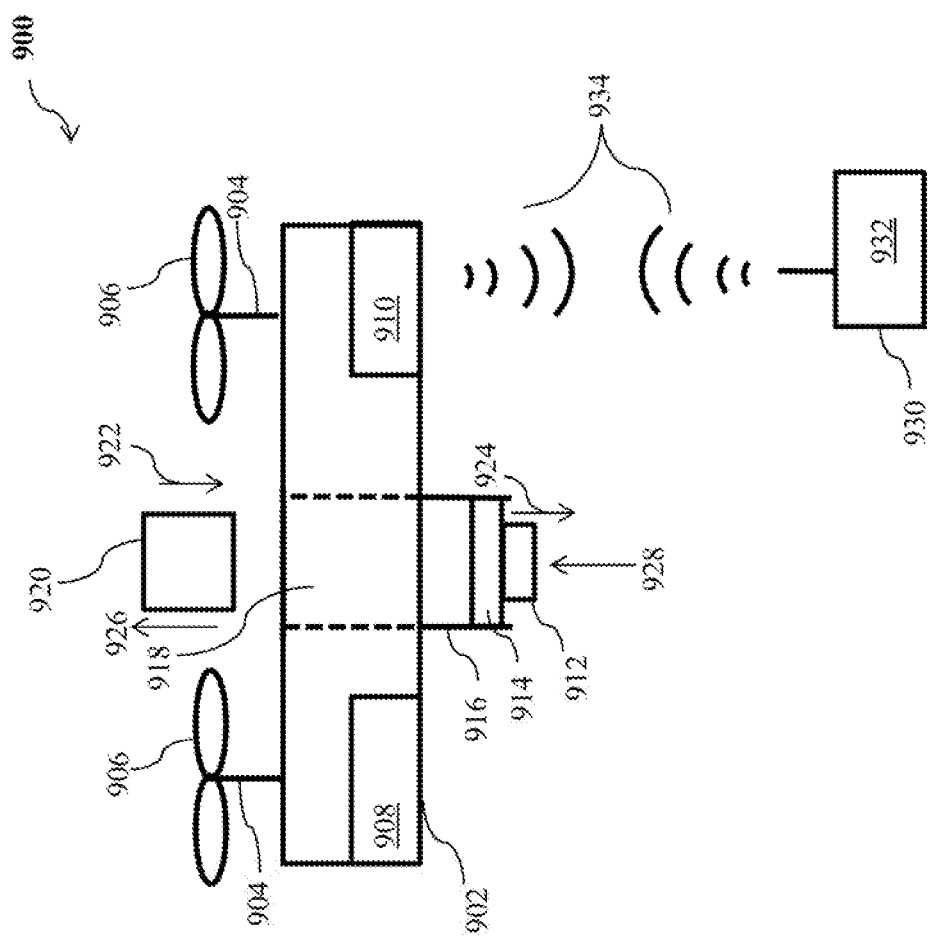
FIG. 9 illustrates a movable object, in accordance with embodiments of the disclosure.

FIG. 9 illustrates a movable object 900 in accordance with embodiments of the disclosure. Although the movable object 900 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., a UAV). The movable object 900 may include a central body 902, one or more arms 904, propulsion mechanisms or units 906 supported by the arms, a sensing system 908, and a communication system 910. In some instances, a payload 912 may be provided on the movable object 900. In some embodiments, the payload may be directly coupled to the moveable object. In some embodiments, the payload may be coupled to the moveable object via a carrier 914. In some embodiments, the carrier supporting the payload may be directly coupled to the central body. In some embodiments, the carrier may be coupled to the central body via a connecting mechanism 916. The connecting mechanism herein may comprise any suitable mechanical mechanisms, elements, components, member, such as a chaining mechanism, a linkage mechanism, an actuator mechanism, a locking mechanism, a quick release mechanism, screws, bolts, fastener, elastic elements, hooks, belts, chains, and the like.

The propulsion mechanisms can include one or more of rotors, propellers, blades, engines, motors, wheels, axles, magnets, or nozzles. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms can be mounted on the movable object using any suitable means, such as a support element (e.g., a drive shaft) as described elsewhere herein. The propulsion mechanisms can be mounted on any suitable portion of the movable object, such on the top, bottom, front, back, sides, or suitable combinations thereof.

In some embodiments, the propulsion mechanisms can enable the movable object to take off vertically from a surface or land vertically on a surface without requiring any horizontal movement of the movable object (e.g., without traveling down a runway). Optionally, the propulsion mechanisms can be operable to permit the movable object to hover in the air at a specified position and/or orientation. One or more of the propulsion mechanisms may be controlled independently of the other propulsion mechanisms. Alternatively, the propulsion mechanisms can be configured to be controlled simultaneously.

For example, the movable object can have multiple horizontally oriented rotors that can provide lift and/or thrust to the movable object. The multiple horizontally oriented rotors can be actuated to provide vertical takeoff, vertical landing, and hovering capabilities to the movable object. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object (e.g., with respect to up to three degrees of translation and up to three degrees of rotation).

The sensing system can include one or more sensors that may sense the spatial disposition, velocity, and/or acceleration of the movable object (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system can be used to control the spatial disposition, velocity, and/or orientation of the movable object (e.g., using a suitable processing unit and/or control module, as described below).

Alternatively, the sensing system can be used to provide data regarding the environment surrounding the movable object, such as weather conditions, proximity to potential obstacles, location of geographical features, location of manmade structures, and the like. In some embodiments, the sensing system herein may be able to provide data about the location of the payload supported by the payload stabilization assembly and connected with the constant force assembly. Therefore, by driving operations of one or more driving units, the payload together with the payload stabilization assembly may return an expected position.

Further arranged on the central body is a compartment 918. The compartment may be arranged at the central portion of the central body. Alternatively, in some embodiments, the compartment may be arranged around the perimeter or circumference of the central body. In some embodiments, the compartment may be arranged around the center of the central body. The number of the compartments can be set according to the application requirements. For example, the number of the compartments may be one, two, three, or four. These compartments may be symmetrically or asymmetrically arranged.

The volume of the compartment can be configured based on the dimensions of the components that are received into or pushed out of the compartment. In some embodiments, the volume of the compartment may be proportional to the volume of the central body and may occupy a certain percentage of the volume of the central body, e.g., 10%, 20%, 25%, 30%, 35%, 40%, 45%, 50%, or more.

The compartment may selectively receive one or more types of components 920. The components may include but are limited to a battery unit, a flight control system, one or more arms, landing gears, the payload, the carrier as described above and elsewhere herein. Upon receiving the one or more components into the compartment in the direction as shown at 922, other components may be responsively extended or pushed out of the compartment in a direction as shown at 924. As different component(s) are received into the compartment, the operational states of the movable object may be changed simultaneously or after a given time. For example, in some embodiments, when a battery unit is received into the compartment and the carrier is pushed out of the compartment accordingly, the moveable object may transform from a power-off state into a power-on state for operation. In contrast, when the battery unit is pushed out of the compartment in a direction as shown at 926 and the carrier is pushed (retracted) back to the compartment in a direction as shown at 928, then the operational state of the movable object may transform from the power-on state to the power-off state. It can be seen the operational state of the movable object may be effected based on the type(s) of components that are selectively received in the compartment.

The communication system enables communication with a terminal 930 having a communication system 932 via wireless signals 934. The communication systems 910 and 932 may include any number of transmitters, receivers, and/or transceivers suitable for wireless communication. The communication may be one-way communication, such that data can be transmitted in only one direction. For example, one-way communication may involve only the movable object transmitting data to the terminal, or vice-versa. The data may be transmitted from one or more transmitters of the communication system 910 to one or more receivers of the communication system 932, or vice-versa.

Alternatively, the communication may be two-way communication, such that data can be transmitted in both directions between the movable object and the terminal. The two-way communication can involve transmitting data from one or more transmitters of the communication system to one or more receivers of the communication system, and vice-versa. In some embodiments, the data regarding the movement of the multiple foldable sections of the arm may also be transmitted by the communication system to the terminal. Thereby, the terminal user may be able to control the lateral movements of the foldable sections relative to a central body by controlling one or more actuator mechanisms connected to the central body.

In some embodiments, the terminal can provide control data to one or more of the movable object, carrier, and payload and receive information from one or more of the movable object, carrier, and payload (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload.

For example, the control data may result in a modification of the location and/or orientation of the movable object (e.g., via control of the propulsion mechanisms), or a movement of the payload with respect to the movable object (e.g., via control of the carrier). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of a sensing system or of the payload). The communications may include sensed information from one or more different types of sensors (e.g., GPS sensors, motion sensors, inertial sensor, proximity sensors, or image sensors).

Such information may pertain to the position (e.g., location, orientation), movement, or acceleration of the movable object, carrier and/or payload. Such information from a payload may include data captured by the payload or a sensed state of the payload. The control data provided transmitted by the terminal can be configured to control a state of one or more of the movable object, carrier, or payload. Alternatively or in combination, the carrier and payload can also each include a communication module configured to communicate with terminal, such that the terminal can communicate with and control each of the movable object, carrier, and payload independently. In some embodiments, the control data may related to retraction of the payload or carrier into the compartment such that the payload or carrier may automatically move into the compartment in response to the control data.

In some embodiments, the movable object can be configured to communicate with another remote device in addition to the terminal, or instead of the terminal. The terminal may also be configured to communicate with another remote device as well as the movable object. For example, the movable object and/or terminal may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object, receive data from the movable object, transmit data to the terminal, and/or receive data from the terminal. Optionally, the remote device can be connected to the Internet or other telecommunications network, such that data received from the movable object and/or terminal can be uploaded to a website or server.

Figure 10:
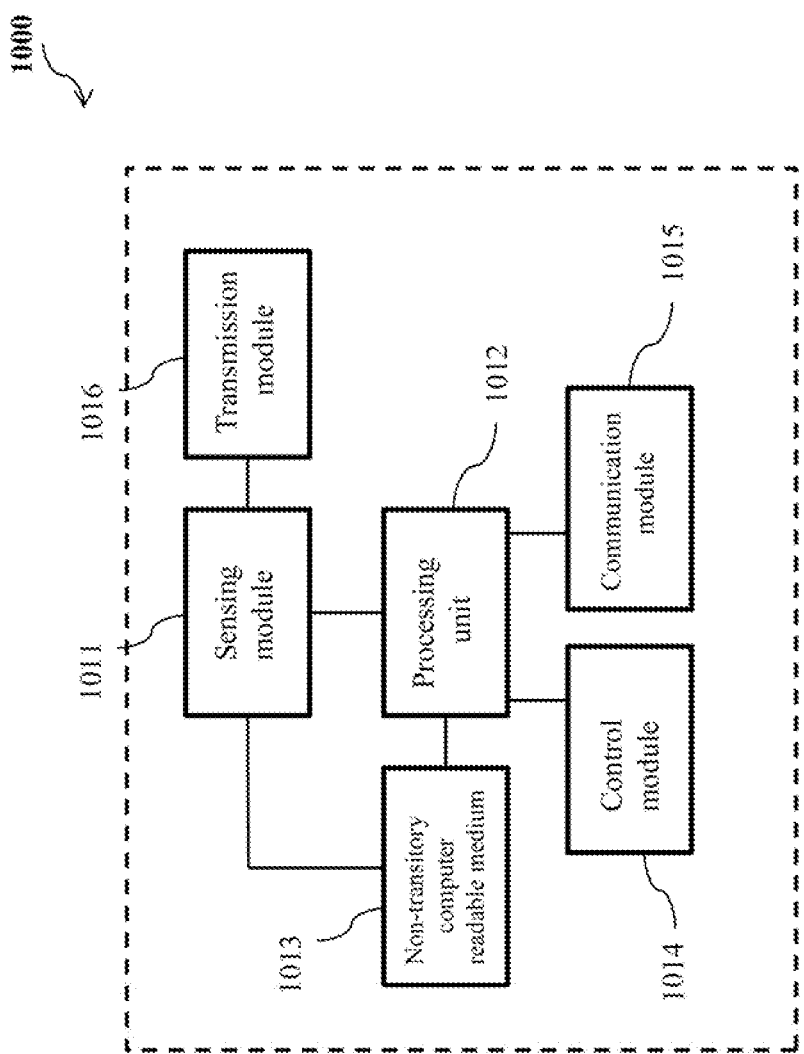
FIG. 10 illustrates a block diagram of a system for controlling a movable object, in accordance with embodiments of the disclosure.

FIG. 10 is a block diagram of a system 1000 for controlling a movable object, in accordance with embodiments. The system 1000 can be used in combination with any suitable embodiment of the systems, devices, and methods disclosed herein. The system 1000 can include a sensing module 1011, a processing unit 1012, non-transitory computer readable medium 1013, a control module 1014, a communication module 1015, and a transmission module 1016.

The sensing module can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module can be operatively coupled to the processing unit having a plurality of processors. In some embodiments, the sensing module can be operatively coupled to the transmission module (e.g., a Wi-Fi image transmission module) configured to directly transmit sensing data to a suitable external device or system. For example, the transmission module can be used to transmit images captured by a camera of the sensing module to a remote terminal. Alternatively, the transmission module can be used to transmit the locations of the components relative to a central body of a UAV, which may be considered as a specific form of the movable object, to the remote terminal, such that the user may be able to control the retraction of the components into the compartment or the pushing of the components out of the compartment.

The processing unit can have one or more processors, such as a programmable processor (e.g., a central processing unit (CPU)). The processing unit can be operatively coupled to a non-transitory computer readable medium. The non-transitory computer readable medium can store logic, code, and/or program instructions executable by the processing unit for performing one or more steps. The non-transitory computer readable medium can include one or more memory units (e.g., removable media or external storage such as an SD card or random access memory (RAM)). In some embodiments, data from the sensing module can be directly conveyed to and stored within the memory units of the non-transitory computer readable medium. The memory units of the non-transitory computer readable medium can store logic, code and/or program instructions executable by the processing unit to perform any suitable embodiment of the methods described herein. For example, the processing unit can be configured to execute instructions causing one or more processors of the processing unit to analyze sensing data produced by the sensing module. The memory units can store sensing data from the sensing module to be processed by the processing unit. In some embodiments, the memory units of the non-transitory computer readable medium can be used to store the processing results produced by the processing unit.

In some embodiments, the processing unit can be operatively coupled to a control module configured to control a state of the movable object. For example, the control module can be configured to control the propulsion mechanisms of the movable object to adjust the spatial disposition, velocity, and/or acceleration of the movable object with respect to six degrees of freedom. Alternatively or in combination, the control module can control one or more of a state of a carrier, payload, or sensing module. According to the embodiments of the disclosure, the control module may also be capable of controlling the movement or actuation of the one or more components into or out of the compartment.

The processing unit can be operatively coupled to the communication module configured to transmit and/or receive data from one or more external devices (e.g., a terminal, display device, or other remote controller). Any suitable means of communication can be used, such as wired communication or wireless communication. For example, the communication module can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module can transmit and/or receive one or more of sensing data from the sensing module, processing results produced by the processing unit, predetermined control data, user commands from a terminal or remote controller, and the like.

The components of the system can be arranged in any suitable configuration. For example, one or more of the components of the system can be located on the movable object, carrier, payload, terminal, sensing system, or an additional external device in communication with one or more of the above. Additionally, although FIG. 10 depicts a single processing unit and a single non-transitory computer readable medium, one of skill in the art would appreciate that this is not intended to be limiting, and that the system can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system can occur at one or more of the aforementioned locations.

Any description herein of a carrier may apply to stabilizing devices as described or any other type of carrier.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. A method for operating a vehicle chassis comprising:
providing the vehicle chassis comprising a main body and at least one a compartment arranged on the vehicle chassis;
selectively receiving a first component in the compartment, the first component being selected from a plurality of components of different types;
effecting an operational state of a vehicle comprising the vehicle chassis based on a type of the first component selectively received in the compartment;
inserting or retracting a second component from the plurality of components into the compartment, resulting in extending or pushing the first component within the compartment out of the compartment and
effecting the operational state of the vehicle comprising the vehicle chassis based on a type of the second component received in the compartment.

2. The method of claim 1 further comprising:
selecting the first component from a group comprising of a battery unit, a flight control module, and/or landing gears;
wherein the vehicle is powered on and/or in motion when the vehicle is in the operational state.

3. The method of claim 1, further comprising:
selecting the first component from a group comprising of a payload, a carrier configured to support the payload, and/or an arm configured to support a propulsion unit of the vehicle;
wherein the vehicle is powered off and/or at rest when the vehicle is in the operational state.

4. The method of claim 1, wherein the compartment is configured to accept only one type of component within its cavity at any given time.

5. The method of claim 1, wherein the compartment is configured to accept multiple different types of components within its cavity at any given time.

6. The method of claim 1, wherein the first component includes a battery unit and the second component includes a payload and/or carrier.

7. The method of claim 1, wherein the second component is inserted or retracted in a first direction and the first component is extended or pushed out in a second direction that is same or different from the first direction.

8. The method of claim 1 wherein when the first component is pushed out of the compartment by the second component, a space is generated within the compartment for receiving a third component from the plurality of components.

9. The method of claim 1, wherein the second component is configured to push the first component out of the compartment such that the second component is completely received within the compartment.

10. The method of claim 1, wherein the second component is:
a battery unit for powering the vehicle when the battery unit is inserted or retracted into the compartment; or a flight control module for flight control of the vehicle when the flight control module is inserted or retracted into the compartment.

11. The method of claim 1, wherein:
the first component is a battery unit and the second component is a payload and/or carrier; and
the payload and/or carrier is inserted or retracted into the compartment to push the battery unit out of the compartment such that power to the vehicle, the payload, and/or the carrier is terminated.

12. The method of claim 1, wherein:
the first component is a payload and/or carrier and the second component is a battery unit; and
the battery unit is inserted or retracted into the compartment to push the payload and/or carrier out of the compartment such that the battery unit powers at least one of the payload, the carrier, or the vehicle.

13. The method of claim 1, further comprising:
removing or extending out the first component from the compartment based on the operational state of the vehicle.

14. The method of claim 13, further comprising:
selecting the first component from a group comprising of a payload, a carrier configured to support the payload, and/or an arm configured to support a propulsion unit of the vehicle;
wherein the vehicle is powered on and/or in motion when the vehicle is in the operational state.

15. The method of claim 13, further comprising:
selecting the first component from a group comprising of a battery unit, a flight control module, and/or landing gears;
wherein the vehicle is powered off and/or at rest when the vehicle is in the operational state.

16. The method of claim 1, wherein inserting or retracting the second component into the compartment triggers the first component to be pushed out of the compartment.

17. The method of claim 16, wherein the first component is pushed out of the compartment by a driving unit.

18. A vehicle, comprising:
a vehicle chassis including:
a main body; and
a compartment arranged at the main body, the compartment having at least one opening for selectively receiving one or more components a first component from a plurality of components of different types; and
a propulsion system operably coupled to the vehicle chassis, the propulsion system being configured to provide lift for the vehicle;
wherein:
an operational state of the vehicle is effected based on a type of the first component selectively received in the compartment; and
in response to inserting or retracting a second component from the plurality of components into the compartment, the first component within the compartment is extended or pushed out of the compartment, and the operational state of the vehicle is effected based on a type of the second component received in the compartment.

* * * * *